United States Patent
Wang et al.

(10) Patent No.: US 9,325,585 B1
(45) Date of Patent: Apr. 26, 2016

(54) MISSION-DRIVEN AUTONOMOUS AND ADAPTIVE RESOURCE MANAGEMENT

(75) Inventors: Guijun Wang, Issaquah, WA (US); Changzhou Wang, Bellevue, WA (US); Sharon F. Arroyo, Sammamish, WA (US); Haiqin Wang, Redmond, WA (US)

(73) Assignee: The Boeing Company, Chicago, IL (US)

(*) Notice: Subject to any disclaimer, the term of this patent is extended or adjusted under 35 U.S.C. 154(b) by 726 days.

(21) Appl. No.: 13/545,357

(22) Filed: Jul. 10, 2012

(51) Int. Cl.
*G06F 15/173* (2006.01)
*H04L 12/24* (2006.01)
*H04L 12/857* (2013.01)
*H04L 12/727* (2013.01)

(52) U.S. Cl.
CPC ........ *H04L 41/5067* (2013.01); *H04L 47/2491* (2013.01); *H04L 45/121* (2013.01)

(58) Field of Classification Search
CPC . H04W 28/0268; H04W 28/24; H04W 28/16; H04L 47/2433; H04L 47/2491; H04L 41/5067; H04L 41/5003; H04L 41/5006; H04L 41/5019; H04L 47/2425; H04L 45/121
See application file for complete search history.

(56) References Cited

U.S. PATENT DOCUMENTS

| | | | |
|---|---|---|---|
| 6,748,220 B1 | 6/2004 | Chow et al. | |
| 6,993,040 B2 | 1/2006 | Davis | |
| 7,362,766 B2 | 4/2008 | Karlsson et al. | |
| 7,983,299 B1 | 7/2011 | Ma | |
| 8,046,464 B2 | 10/2011 | Wang et al. | |
| 2003/0009597 A1* | 1/2003 | Joung | 709/249 |
| 2003/0009867 A1* | 1/2003 | Whiten | B21J 15/10 29/34 B |
| 2005/0177644 A1* | 8/2005 | Basso | H04L 12/5693 709/232 |
| 2005/0204054 A1* | 9/2005 | Wang | G06F 9/5011 709/232 |
| 2006/0129687 A1* | 6/2006 | Goldszmidt | G06F 9/505 709/229 |
| 2006/0280119 A1* | 12/2006 | Karamanolis | G06F 9/50 370/229 |
| 2006/0294044 A1* | 12/2006 | Karlsson | G06Q 10/06 |

(Continued)

OTHER PUBLICATIONS

Daniel P. Bovet and Marco Cesati, "Understanding the Linus Kernel,"O'Reilly, First Edition Oct. 2000, Forward, Table of Contents, (Chapter 1), pp. 1-35 , (Chapter 2) 36-63 and (Chapter 10) 258-276.

(Continued)

*Primary Examiner* — Ario Etienne
*Assistant Examiner* — Kidest Mendaye
(74) *Attorney, Agent, or Firm* — Kunzler Law Group, PC

(57) ABSTRACT

One or more systems, methods, routines and/or techniques for mission-driven autonomous and adaptive resource management, for example to achieve mission objectives in Quality of Service-managed networked systems, are described. One or more resource allocation algorithms and one or more associated control architectures including component services may be used. A system and/or method may collect input parameters, evaluate system workloads and performance metrics, optimize resource allocations, and adapt to changing workloads and performance metrics to achieve mission objectives. One or more objective functions, one or more constraints and one or more optimization algorithms may be utilized to achieve optimal allocation of resources to maximize the delivered value of an objective function and/or the system. The systems, methods, routines and/or techniques described herein may be autonomic and self-adaptive without requiring human administrators to pre-determine parameters (e.g., demands on resources or performance properties) for specific applications, processes and/or clients.

21 Claims, 10 Drawing Sheets

(56) References Cited

U.S. PATENT DOCUMENTS

| | | | | |
|---|---|---|---|---|
| 2007/0070894 A1* | 3/2007 | Wang | ................ | H04W 72/1242 370/230 |
| 2011/0134934 A1* | 6/2011 | Arroyo | ................ | H04L 12/5695 370/431 |
| 2011/0154324 A1* | 6/2011 | Pagan | ................ | G06F 9/45558 718/1 |

OTHER PUBLICATIONS

Alan Demers, Srinivasan Keshav, Scott Shenker, Analysis and Simulation of a Fair Queueing Algorithm, John Wiley & Sons, Ltd., Jan. 1, 1990, Revised Apr. 10, 1990, pp. 1-26, Internetworking: Research and Experience, vol. 1, 3-26.

Jon C. R. Bennett and Hui Zhang, "WF2Q: Worst-case Fair Weighted Fair Queueing," School of Computer Science, Carnegie Mellon University and FORE Systems.

Jon C. R. Bennett and Hui Zhang, "Hierarchical Packet Fair Queueing Algorithms," IEEE, Oct. 1997, pp. 675-689, ADM Transaction on Networking, vol. 5, No. 5.

Gallardo and Makrakis, "Dynamic predictive weighted fair queueing for differentiated services," IEEE International Conference on Communications, Jun. 2001, ICC 2001, pp. 2380-2384.

Tomas Balog and Martin Medvecky, "Performance Evaluation of WFQ, WF2Q+ and WRR Queue Scheduling Algorithms," IEEE, TSP 2011, pp. 136-140, 978-1-4577-1411-5/11.

Lin Zhang and Gee-Swee Poo, "Delay Constraint Dynamic Bandwidth Allocation in Ethernet Passive Optical Networks," NTRC, School of EEE, Nanyang Technological University, Singapore, 2004 IEEE, pp. 126-130.

Guijun Wang, Alice Chen, Changzhou Wang, Casey Fung and Stephen Uczekaj, "Integrated Quality of Service (QoS) Management in Service-Oriented Enterprise Architectures," Proceedings of the 8th IEEE Intl Enterprise Distributed Object Computing Conf (EDOC '2004), pp. 1-12, 1541-7719/04.

Samarth Shah, Kai Chen, Klara Nahrstedt, "Dynamic Bandwidth Managemetn fo Single-hop Ad Hoc Wireless Networks," ACM/Kluwer Mobile Networks and Applications (MONET) Journal, Special Issue on Algorithmic Solutions for Wireless, Mobile, Ad Hoc and Sensor Networks, vol. 10, No. 1, 2006 pp. 199-217/.

Guijun Wang, Changzhou Wang, Alice Chen, Haiqin Wang, Casey Fung, Stephen Uczekaj, Yiliang Chen, Wayne Guthmiller and Joseph Lee, Service Level Management using QoS Monitoring Diagnostics, and Adaptation for Networked Enterprise Systems, Proceedings of the 200t Ninth IEEE International EDOS Enterprise Computing Conference, (EDOC '05) pp. 1-10, 0-7695-2441-9/05.

* cited by examiner

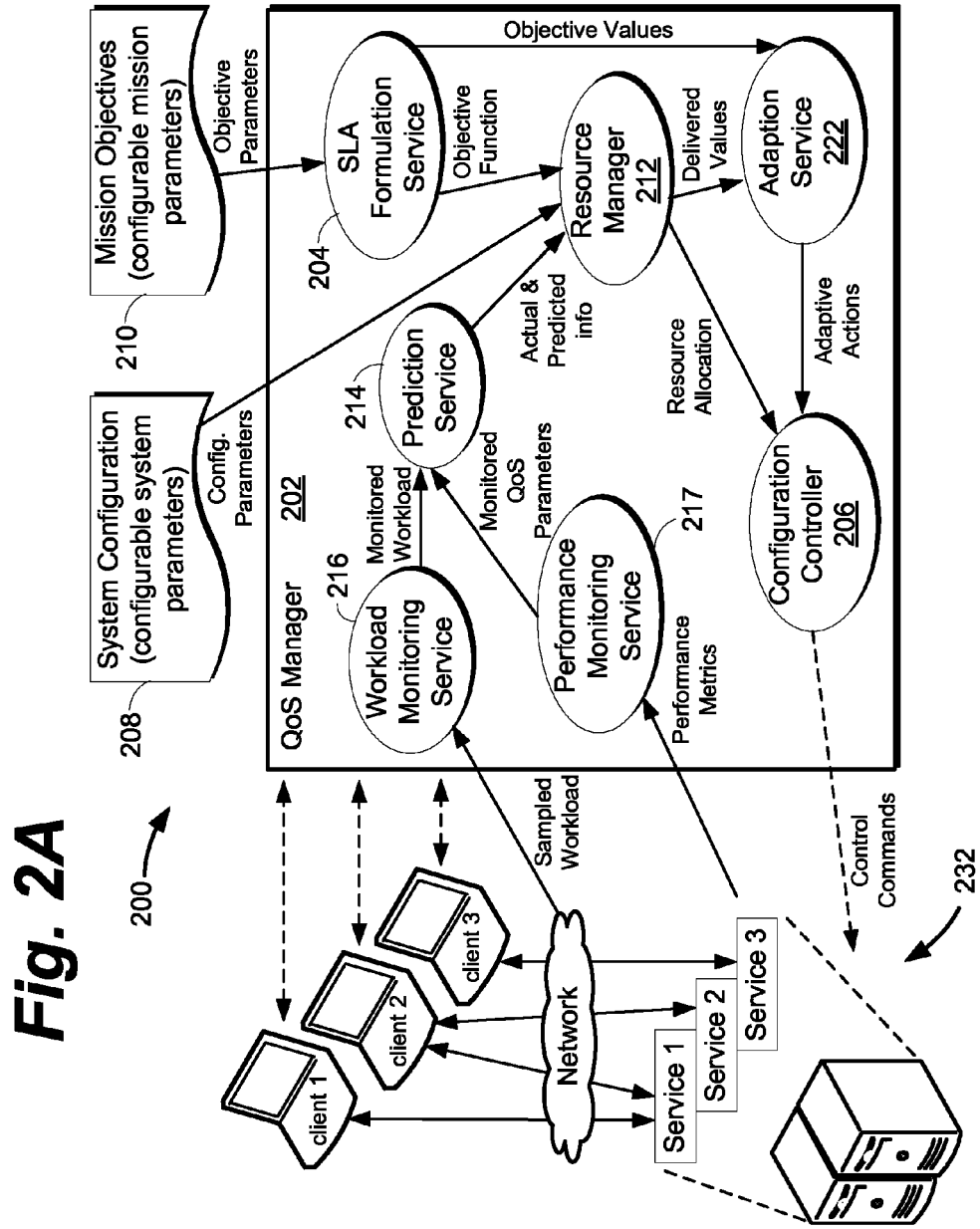

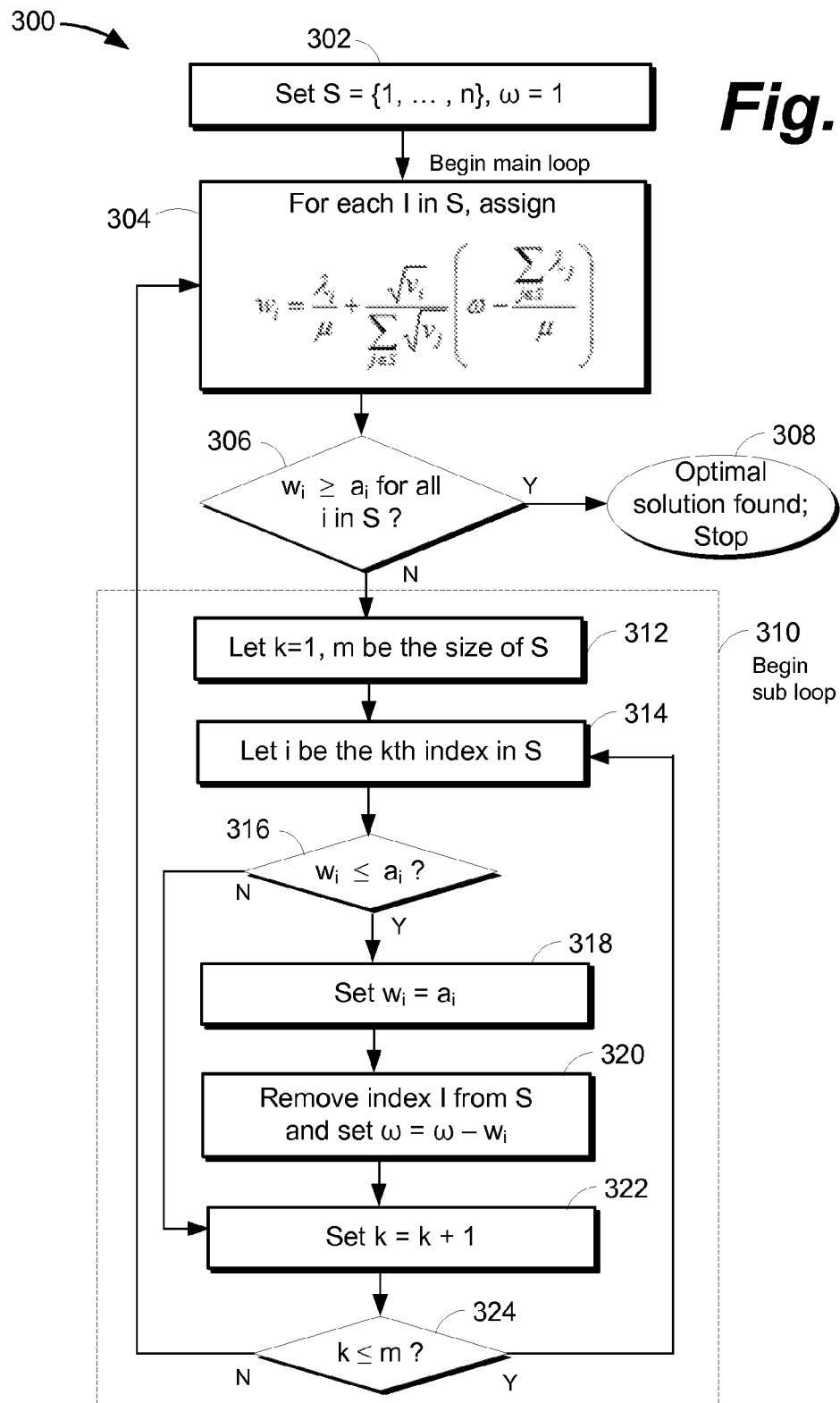

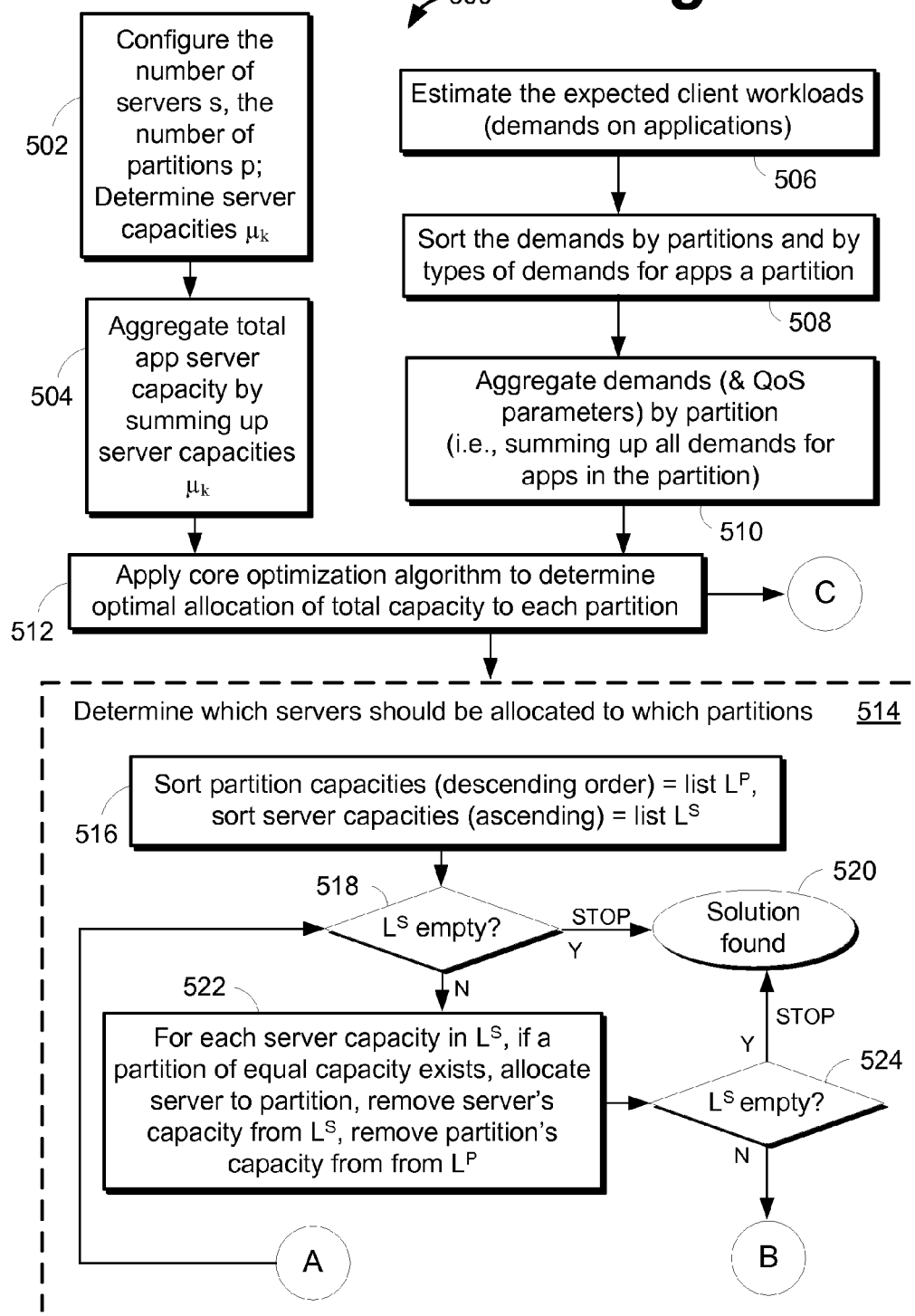

MISSION-DRIVEN AUTONOMOUS AND ADAPTIVE RESOURCE MANAGEMENT

CROSS-REFERENCE TO RELATED APPLICATIONS

None.

FIELD

The present disclosure relates to resource allocation, and more particularly to one or more systems, methods, routines and/or techniques for mission-driven autonomous and adaptive resource management, for example to achieve mission objectives in Quality of Service-managed networked systems.

BACKGROUND

Quality of Service (QoS) management may be implemented in a system to optimize the use of system resources by a plurality of concurrent applications/processes/clients that request system resources. One example system, an operating system (OS), may use various scheduling algorithms to share common CPU, Disk, I/O and Network resources among concurrent applications and/or processes.

Demands by applications, processes and/or clients for resources may be characterized by their workloads on the system and can be modeled using parameters like an expected arrival rate. More detailed parameters like required CPU time and I/O throughput could also be considered. Applications, processes and/or clients sharing common demand characteristics can be aggregated into classes of demand types, to simplify the analysis and management of resource sharing strategies and their QoS effects. Similarly, resources and/or service provider capacities (for example, the ability to process client demands) may be characterized using parameters like an average service rate $\mu$ or the average time required for serving a unit of work.

QoS management is currently used in some systems to attempt to process high priority demands in a timely manner. Higher priority demands may be allocated a larger share of a service provider's capacity. Some systems may seek to allocate shared resources to meet concurrent demands. How well a system performs resource allocation can be characterized by Quality of Service (QoS) parameters, such as performance, scalability, availability and cost.

SUMMARY

One or more systems, methods, routines and/or techniques for mission-driven autonomous and adaptive resource management, for example to achieve mission objectives in Quality of Service-managed networked systems, are described. One or more resource allocation algorithms and one or more associated control architectures including component services may be used. A system and/or method may collect input parameters and/or monitor system conditions, evaluate system workloads and performance metrics, optimize resource allocations, and adapt to changing workloads and performance metrics to achieve mission objectives. One or more objective functions, optionally one or more constraints, and one or more optimization algorithms may be utilized to achieve optimal allocation of resources to maximize the delivered value of an objective function and/or the system. The systems, methods, routines and/or techniques described herein may be autonomic and self-adaptive without requiring human administrators to pre-determine parameters (i.e., demands on resources or performance properties) for specific applications, processes and/or clients.

One or more embodiments of the present disclosure describe a computer implemented method for resource management. The method may execute on one or more computers and include a number of routines that are executed on one or more of the computers. The method may include a routine that receives as input mission objective parameters. In some examples, the mission objective parameters may include one or more demand characteristics for each type of client demand. The demand characteristics may include importance and urgency values for each type of client demand. The demand characteristics may include an expected arrival rate for each type of client demand. In some examples, the mission objective parameters may include two-dimensional quality of service values for each type of client demand. The method may include a routine that formulates an objective function and one or more objective values using the mission objective parameters. In some examples, the objective function may allow for the determination of an optimal resource allocation relative to a resource allocation that uses a best effort approach. In some examples, the objective function may allow for the determination of an optimal resource allocation that is guaranteed to achieve the maximum delivered value possible among all resource allocations. In some examples, the objective function may include an optimal weight term for each client demand type that represents an optimal fraction of resources that should be devoted to each type of client demand. In some examples, the objective function may include a best-effort weight term for each client demand type that represents the fraction of resources devoted to each type of client demand using a best-effort approach. In some examples, the mission objective parameters may include a service rate that represents the rate at which the service provider can process requests for all client demands. In some examples, the mission objective parameters include a tolerance factor that constrains the possible solutions. The method may include a routine that autonomously optimizes the objective function using an optimization algorithm to determine optimal resource allocations and associated delivered values. In some examples, autonomously optimizing the objective function may include determining a value for one or more of the optimal weight terms. The method may include a routine that indicates, via a configuration controller for example, the optimal resource allocations to one or more service providers, such that the service providers may implement the optimal resource allocations to process demands from one or more clients.

In some embodiments, the method may include a routine that receives as input monitored workloads of the one or more clients. The method may include a routine that receives as input monitored performance metrics of the one or more service providers. The method may include a routine that determines actual and predicted workloads and performance metrics using the monitored workloads and the monitored performance metrics. The actual and predicted workloads and performance metrics may be used to autonomously optimize the objective function. In some embodiments, the method may include a routine that compares the delivered values associated with the optimal resource allocations to the objective values. The method may execute one or more adaptive algorithms based on the comparison to determine one or more adaptive actions. The method may indicate to the configuration controller, the one or more adaptive actions. In some examples, some or all of the steps of the method may be continuously executed to adapt to variations in inputs.

One or more embodiments of the present disclosure describe a resource management system. The system may include a quality of service manager that may be operable to manage allocation of resources. The resources may be hosted on one or more service providers, and one or more clients may demand access to the resources. The system may include a SLA formulation service module that may be operable to receive as input mission objective parameters, and may formulate an objective function and one or more objective values using the mission objective parameters. In some examples, the mission objective parameters include one or more demand characteristics for each type of client demand, wherein the one or more demand characteristics include importance and urgency values. In some examples, the objective function may adapt the resource management system to determine an optimal resource allocation relative to a resource allocation that uses a best effort approach. In some examples, the objective function may adapt the resource management system to determine an optimal resource allocation that is guaranteed to achieve the maximum delivered value possible among all resource allocation solutions. The system may include a resource manager that may be operable to autonomously optimize the objective function using an optimization algorithm to determine optimal resource allocations and associated delivered values. The system may include a configuration controller that may be operable to indicate the optimal resource allocations to the one or more service providers, such that the service providers may implement the optimal resource allocations to process demands from the one or more clients.

In some embodiments, the system may include a workload monitoring service module that may be operable to receive as input monitored workloads of the one or more clients. The system may include a performance monitoring service module that may be operable to receive as input monitored performance metrics of the one or more service providers. The system may include a prediction service module that may be operable to determine actual and predicted workloads and performance metrics using the monitored workloads and the monitored performance metrics. The prediction service module may communicate actual and predicted workloads and performance metrics to the resource manager to be used to autonomously optimize the objective function. In some embodiments, the system may include an adaptation service module that may be operable to compare the delivered values associated with the optimal resource allocations to the objective values. The adaptation service module may also be operable to execute one or more adaptive algorithms based on the comparison to determine one or more adaptive actions and may be operable to indicate, to the configuration controller for example, the one or more adaptive actions.

One or more embodiments of the present disclosure describe a cloud data center that may include a resource management system similar to systems described herein. One or more embodiments of the present disclosure describe a messaging application server that may include a resource management system similar to systems described herein. One or more embodiments of the present disclosure describe a client-server application server that may include a resource management system similar to systems described herein.

These and other advantages, aspects and novel features of the present disclosure, as well as details of an illustrated embodiment thereof, will be more fully understood from the following description and drawings. It is to be understood that the foregoing general descriptions are exemplary and explanatory only and are not restrictive of the disclosure as claimed.

BRIEF DESCRIPTION OF THE DRAWINGS

Several features and advantages are described in the following disclosure, in which several embodiments are explained, using the following drawings as examples.

FIG. 2A depicts an illustration of a block diagram showing example components, services and interactions of a system for mission-driven autonomous and adaptive resource management, according to one or more embodiments of the present disclosure.

FIG. 3 depicts a flow diagram that shows example steps in the operation of an example system for mission-driven autonomous and adaptive resource management, for example steps executed by a resource manager, in accordance with one or more embodiments of the present disclosure.

FIG. 5A depicts a flow diagram that shows example steps in the operation of an example system for mission-driven autonomous and adaptive resource management, for example steps executed by a resource manager, in accordance with one or more embodiments of the present disclosure.

DETAILED DESCRIPTION

Figure 1:
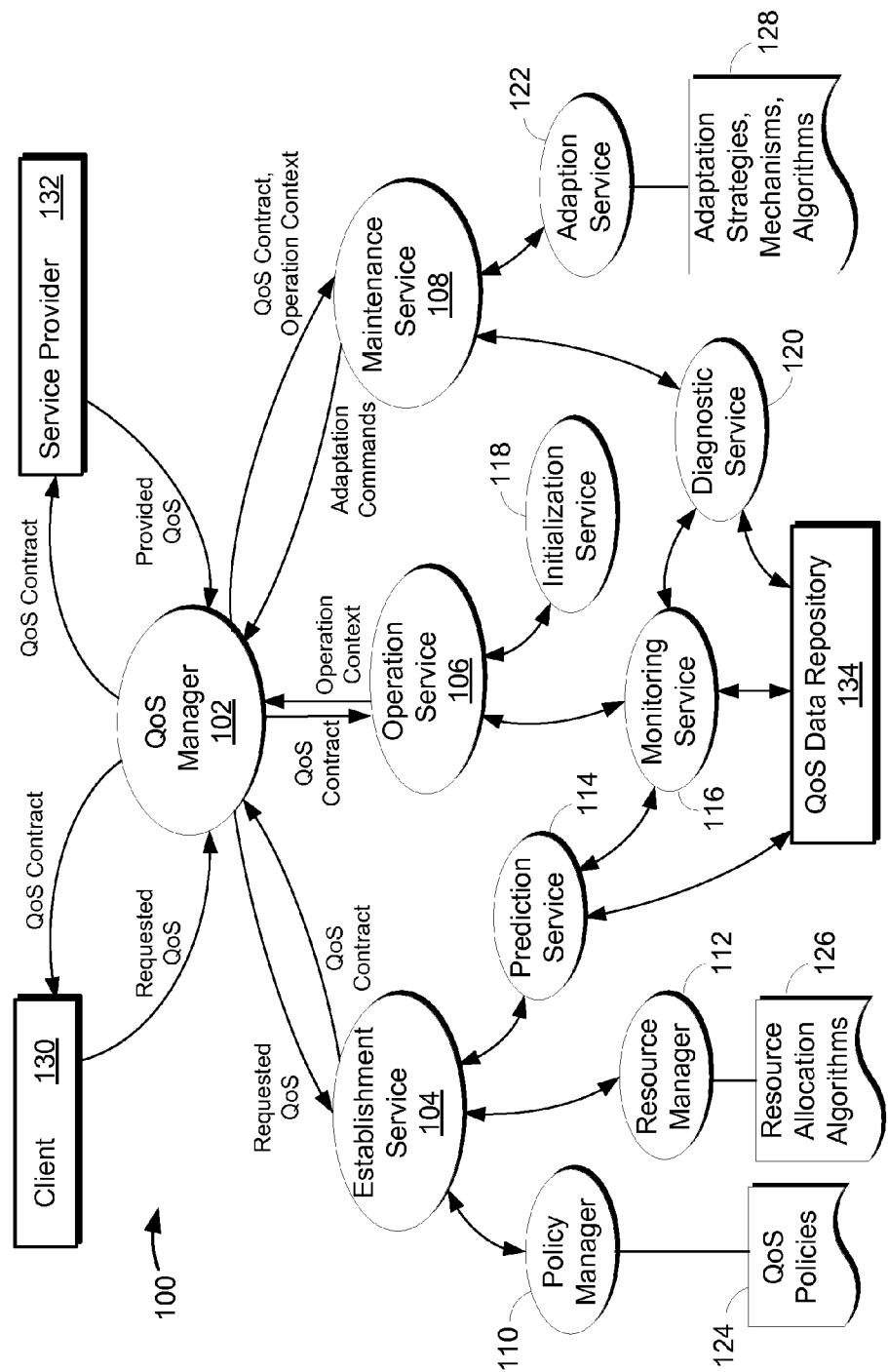
FIG. 1 depicts an illustration of a block diagram showing example components, services and interactions of a system for mission-driven autonomous and adaptive resource management, according to one or more embodiments of the present disclosure.

Although techniques exist to allocate shared resources to meet concurrent demands of applications and/or processes and/or clients, there are several disadvantages to current techniques. Current techniques require administrator or user configurations and/or pre-configured application and/or demand profiles of resource utilization. For example, existing resource allocation algorithms use priorities to control the utilization of resources among concurrent applications and/or processes and/or clients. In existing systems, these priorities are manually set by a user or administrator and/or specified in prioritization policies, which are manually set by a user and/or administrator. These algorithms assume that priorities are a given and allocate resources to applications and/or processes and/or clients in some intuitive proportions corresponding to their priorities. Some existing algorithms use control parameters such as a weight to schedule the utilization of resources based on the relative control parameters of applications and/or processes and/or clients. These algorithms assume the control parameters are given by a user or administrator and/or specified in some policies, which are manually set by a user and/or administrator. Furthermore, the calculation of the control parameters in those policies has been done in an ad-hoc intuitive manner and has not been optimized for mission objectives. Some existing algorithms may also require applications and/or processes and/or clients to specify their demands ahead of time before deployment, for example by using min/max share parameters to specify the minimal and maximal amount of resources needed. Existing techniques that allow for automatic determination of one required parameter, for example a weight to a resource share, do so at the cost of requiring the manual entry of another parameter, for example a delay bound or a min/max bandwidth requirement for each application and/or process. Yet other existing systems that may allow for automatic determination of parameters only work for overly-simplistic systems, systems with pre-defined resource allocation polices, which again are manually set by a user and/or administrator.

Therefore, a resource allocation system that provides automatic management of system resources to service client demands is desirable. The present disclosure describes one or more systems, methods, routines and/or techniques for mission-driven autonomous and adaptive resource management, for example to achieve mission objectives in QoS (Quality of Service)-managed networked systems. The systems, methods, routines and/or techniques described herein may utilize one or more mission-driven autonomous and adaptive resource allocation algorithms and one or more associated control architectures and component services. The system described herein may collect input parameters and/or monitor system conditions, evaluate system workloads and performance metrics, optimize resource allocation, and adapt to changing workloads and performance metrics to achieve mission objectives. One or more objective functions, optionally one or more constraints, and one or more optimization algorithms may be utilized to achieve optimal allocation of resources to maximize the delivered value of an objective function and/or the system.

The systems, methods, routines and/or techniques described herein may be autonomic and self-adaptive without requiring human administrators to pre-determine parameters (i.e., demands on resources or performance properties) for specific applications, processes and/or clients. The systems, methods, routines and/or techniques described herein may determine optimal resource allocations to deliver maximum mission values, for example according to an objective function. The systems, methods, routines and/or techniques described herein may be operable to achieve mission objectives and desired outcomes, for example utilizing unique expressions of objectives and outcomes. The systems, methods, routines and/or techniques described herein may support mission level expressions of client QoS requirements, for example using two-dimensional (importance and urgency values) characteristics for demands in the mission. The systems, methods, routines and/or techniques described herein may be applicable to several resource-allocation scenarios, for example a client-server scenario, a publish-and-subscribe messaging scenario, a cloud data center scenario and network router scenario.

The term "best effort" or best effort approach or best effort algorithm or best effort strategy may generally refer to one or more allocation strategies and/or schemes and/or algorithms that allocate resources in a "fair share" manner, for example allocating resources equally among competing clients/requests, for example using a round robin approach. Best effort allocation strategies may not consider additional QoS parameters related to a demand, for example importance and urgency values. Best effort allocation strategies may be simple to implement, but may not include optimization strategies to meet mission objectives. The term QoS contract may generally refer to a defined or agreed-upon set of constraints on QoS parameters, such as response time, throughput, and availability of services and/or resources. A QoS contract may be agreed upon between a service and/or resource provider and one or more clients and/or customers. A QoS contract may be created to ensure the service and/or resource provider performs according to the agreed-upon level of service quality for its clients and/or consumers. Clients may be obligated to perform according to the QoS contract as well. For example, if a client publishes data faster than the agreed publishing rate, the client may violate the QoS contract. A QoS contract may constitute a part of a larger Service Level Agreement (SLA) between a provider and its consumers.

The term "demand" may refer generally to one or more signals sent from a client to a service provider whereby the client asks the service provider to perform some task. The term "message" may refer to a type of demand where the client expects no response from the service provider other than routing the message to intended recipients, for example in a messaging application scenario. The term "request" may refer to a type of demand where the client expects a response from the service provider, for example in a client/webpage server scenario. In information systems, the entity that requests a response from a service provider (or demands that a service provider take some action) may take on one of several forms and/or names. The entity may be referred to as a client, a consumer, an application, a process, or other name well known in the information systems art. Therefore, throughout this disclosure, when reference is made to one of these names, for example "client," it should be understood that the described technique may apply to other entities, for example an application or process. In information systems, the entity that responds to a demand and/or request from a client may take on one of several forms and/or names. The entity may be referred to as a service provider, an application provider, an application server, a server cluster, or other name well known in the information systems art. Therefore, throughout this disclosure, when reference is made to one of these names, for example "service provider," it should be understood that the described technique may apply to other entities, for example an application server.

FIG. 1 depicts an illustration of a block diagram showing example components, services and interactions of a system 100 for mission-driven autonomous and adaptive resource management (MAARM), according to one or more embodiments of the present disclosure. Throughout this disclosure, a system that is used to implement the methods, techniques and/or solutions described in this disclosure, such as system 100, may also be referred to as a QoS-managed system. MAARM system 100 may include a QoS (Quality of Service)

manager 102, an establishment service module 104, an operation service module 106 and a maintenance service module 108. MAARM system 100 may further include a policy manager 110, a resource manager 112, a prediction service module 114, one or more monitoring service modules 116, an initialization service module 118, a diagnostic service module 120 and an adaptation service module 122. MAARM system 100 may be in communication with one or more clients 130 (or applications, processes or the like). MAARM system 100 may include or be in communication with one or more service providers (or applications servers, server clusters or the like), for example a service provider that services requests from one or more clients and allocates resources according to demand characteristics.

The QoS Manager 102 may orchestrate the allocation of resources in the MAARM system 100. The QoS Manager 102 may enable a mission-driven autonomous QoS management and self-adaptive control capability for allocating system resources to meet client demands and mission objectives. The QoS Manager may support a service provider's admission control (i.e., whether clients are permitted to use the provider's resources under the provider's current conditions) by enforcing security and QoS policies when a client initiates a session with the service provider. The QoS Manager 102 may include or be in communication with an establishment service module 102, an operation service module 106 and/or a maintenance service module 108. The QoS Manager 102 may accept requests (including QoS requirements) from one or more clients 130 and may communicate with one or more service providers 132 regarding what resources should be allocated to the clients.

The Establishment Service module 104 may establish a QoS contract for a client 130 given QoS requirements provided by the client. In some embodiments, if a QoS contract cannot be established, the Establishment Service module 104 may report the failure to the QoS Manager 102. The Establishment Service module 104 may utilize a Policy Manager 110, a Resource Manager 112 and a Prediction Service module 114. The Policy Manager 110 may check QoS policies 124 to ensure that parameters in a client's QoS requirement are permitted for the client's role, and if permitted, what resources and mechanisms are required to satisfy the requirement. The Resource Manager 112 may provide resource lifecycle management including reservation, allocation, and release for system resources. The Resource Manager 112 may utilize one or more resource allocation algorithms to efficiently manage resources. The Prediction Service module 114 may keep track of existing system conditions in terms of several key system parameters (e.g., memory usage, CPU load, network delay). The Prediction Service module 114 may also predict future system conditions using various prediction algorithms. The Prediction Service module 114 may store and/or retrieve system parameters, and for example other information, from the QoS data repository 134.

The Operation Service module 106 may utilize an initialization service module 118 to initialize resource configuration for a QoS contract and may coordinate services during the execution of a QoS contract. The Operation Service module 106 may be in communication with one or more monitoring service modules 116. The Monitoring Service modules 116 may sample and aggregate QoS parameter values and may store and/or retrieve QoS parameter values, and for example other information, from the QoS data repository 134. The Monitoring Service module 116 may register condition predicates with the Diagnostic Service module 120, and the diagnostic service module may return notifications when the predicates become true, e.g., due to changes in system conditions.

The Maintenance Service module 108 may maintain one or more key QoS parameters for a QoS contract and may activate the Adaptation Service module 122 upon threshold crossings with respect to such parameters. The Adaptation Service module 122 may also take actions upon contract violations by clients. When, for example, an observed parameter returns below its threshold value, the Maintenance Service module 108 may request the Adaptation Service module 122 to restore a QoS level according to the QoS contract. The Adaptation Service module 122 may be operable to dynamically change strategies, mechanisms and/or algorithms regarding resource allocations in order to restore key QoS parameters within normal ranges. The Adaptation Service module 122 may utilize one or more strategies, mechanisms and/or algorithms 128 to facilitate adaptation. An adaptation strategy, mechanism and/or algorithm 128 may be statically configured and dynamically selected based on policies. The Maintenance Service module 108 may be in communication with a Diagnostic Service module 120. The Diagnostic Service module 120 may aggregate low level system signals into attributes on system conditions, for example using formal reasoning models such as causal networks. The Diagnostic Service module 120 may also evaluate any predicates on the attributes upon value changes and trigger notifications to one or more other components, for example, the Monitoring Service module 116.

In operation, upon receiving a request from a client 130, the QoS Manager 102 may extract QoS information from the request, for example the client's role, credentials, and QoS requirements. The QoS Manager 102 may request the Establishment Service module 104 to try to create a QoS contract that satisfies the requirements appropriate for the client's role. The Establishment Service module 104 may interpret the QoS information and may request the Policy Manager 110 to start an admission control process to determine whether the system 100 can admit the client 130 based on its role and requested QoS parameters. If the Policy Manager 110 determines that the client's request is consistent with policies of the system, the Policy Manager 110 may return a set of resources and mechanisms that are to be allocated and activated for the client's request to the Establishment Service module 104. The Establishment Service module 104 may query the Prediction Service module 114 for a current system condition (e.g., lightly loaded, normal, overloaded, etc.) and a predicted availability of resources in the near future. If the Prediction Service module 114 indicates that resources are available, the Establishment Service module 112 may request the Resource Manager 112 to reserve the resources. If the Resource Manager 112 indicates that resources are successfully reserved, the Establishment Service module 104 may return to the QoS Manager 102 a QoS contract, which includes resources and QoS parameters (for example, response time, throughput, and availability) that meet QoS requirements of the client 130. The QoS Manager 102 may forward the QoS contract to the client 130 and may indicate that the client has access to the service provider 132. If the contract does not succeed, the Establishment Service module 104 may return exceptions to the QoS Manager 102, which may notify the client 130.

Once the client 130 agrees to the QoS contract, the QoS Manager 102 may request the Operation Service module 106 to commit and initialize the appropriate resources and mechanisms. The Operation Service module 106 may use the initialization service 118 to request configuration of the appropriate resources, set properties of mechanisms, and activate the resources and mechanisms to start operations. QoS parameter values requested by the client and included in the QoS contract may be translated into attribute value settings on allocated resources. The Operation Service module 106 may indicate to the QoS manager 102 that resources are committed and initialized and the context within which the client 130 may use the resources. The QoS manager 102 may forward the foregoing information to the client 130. The Operation Service module 106 may also set up monitors (via a monitoring service module 116) for QoS parameters if appropriate. The QoS Manager 102 may also connect the Maintenance Service module 108 with the Adaptation Service module 122.

FIG. 2A depicts an illustration of a block diagram showing example components, services and interactions of a system 200 for mission-driven autonomous and adaptive resource management (MAARM), according to one or more embodiments of the present disclosure. Through this disclosure, a system that is used to implement the methods, techniques and/or solutions described in this disclosure, such as system 200, may also be referred to as a QoS-managed system. The system 200 may consist of a mission-driven autonomous QoS management and self-adaptive control architecture for allocating services/resources to meet dynamic client demands and mission objectives. MAARM system 200 may be operable to allocate resources according to the importance and urgency values of client demands, and for example, according to other mission objectives. MAARM system 200 may be substantially similar to the system 100 of FIG. 1 and may include some or all of the components depicted in FIG. 1. FIG. 2A shows a subset of the components depicted in FIG. 1 and some additional components. It should be understood that the system 200 of FIG. 2A may include more components than are shown in FIG. 2A, for example some of the components of FIG. 1. Likewise, the system 100 of FIG. 1 may include more components than are depicted in FIG. 1, for example some of the components of FIG. 2A.

MAARM system 200 may include a QoS (Quality of Service) manager 202, a Service Level Agreement (SLA) Formulation Service module 204, a Resource Manager 212, one or more Monitoring Service modules 216, 217, a Prediction Service module 214, an Adaptation Service module 222 and a Configuration Controller 206. MAARM system 200 may accept as input one or more mission objectives 210. As generally described herein, mission objectives are defined in terms of QoS parameters like response time, throughput, availability, and reliability. However, it should be understood that mission objectives may be defined in a more broad, flexible and/or tangible manner. For example, mission objectives may have both functional aspects, like achieving profit goals or rescuing disaster survivors, and non-functional aspects, for example, in terms of performance, scalability, reliability, availability, and security. Defining mission objectives in terms of QoS parameters (non-functional aspects) related to a computing and communication system may support the ability to achieve functional objectives. A QoS contract, as part of a Service Level Agreement (SLA), between clients and the service provider, defines the constraints on these QoS parameters. An objective function may be formed by the SLA Formulation Service module 204 based on mission objectives and an objective value of the objective function may be set for the operation of the system. The objective function may be used by the Resource Manager 212 to calculate the maximum delivered value for an optimal resource allocation. MAARM system 200 may accept as input system configurations 208. System available resources are defined by configurable system parameters such as number of servers, server capacity, network topology and bandwidth, etc.

Referring to FIG. 2A, MAARM system 200 may be in communication with one or more clients (for example client 1, client 2, client 3). The term client here may refer to the entity that demands that the service provider take some action, perhaps resulting in the allocation of resources. This entity may take on one of several forms and/or names. The entity may be referred to as a client, a consumer, an application, a process, or other form/name well known in the information systems art. Thus, clients need not take the form of discrete computers as depicted in FIG. 2A. Instead, a client could be a process, an application, a service or the like. Clients provide additional QoS requirements to the QoS manager 202 such as importance and urgency values. MAARM system 200 may take client QoS requirements into consideration when determining QoS contracts.

Referring to FIG. 2A, MAARM system 200 may be in communication with one or more service providers 232. Service providers may utilize one or more servers, computers, data processors, clusters of servers or the like. Each service provider may host/provide a number of services/resources (for example service 1, service 2, service 3). Services/resources may be hosted/provided by a variety of combinations of the servers and the like that are utilized by the service providers 232. One or more of the services/resources (for example service 1, service 2, service 3) may be provided to one or more of the clients (for example client 1, client 2, client 3). Based on several factors, for example, arrival rates, classification and QoS requirements of client requests, system configurations and status, different combinations of the services and/or resources may be provided by the service providers 232 to the clients.

The Prediction Service module 214 may accept as input monitored client workloads and monitored QoS parameters provided by one or more monitoring services, for example the Workload Monitoring Service module 216 and the Performance Monitoring Service module 217. Performance metrics, for example, may indicate whether services/resources are being provided to the requesting clients as desired by the system, for example according to the QoS contract, mission objectives and/or other goals/constraints. The Prediction Service module 214 may aggregate monitored client demands and system QoS parameters with agreed upon client demands and QoS parameters, for example provided by an establishment service module (not shown), for example in the QoS contract. The Prediction Service module 214 may determine, among other things, predicted demands of the clients (for example, client 1, client 2, client 3) and system QoS parameters for the future.

The Configuration Controller 206 may be operable to allocate the resources indicated by the Resource Manager 212. The Configuration Controller 206 may also communicate control commands with resource allocation parameters to service providers 232 to effect changes in system configurations. The Configuration Controller 206 may accept input signals from the Adaptation Service module 222, for example an indication of one or more adaptive strategies, mechanisms and/or algorithms that the configuration controller 206 should activate. The Adaptation service module 222 may compare actual delivered values (for example, output of the objective function evaluated in the Resource Manager 212) and objective values (for example, from the SLA Formulation Service 204) and may initiate adaptive strategies, mechanisms and/or algorithms if they have significant differences. The Adaptation service module 222 may select from one or more adaptive strategies, mechanisms and/or algorithms and instruct the Configuration Controller 206 to take adaptive action. Adaptive strategies, mechanisms and/or algorithms may affect the manner in which the configuration controller instructs the service providers 232 to allocate resources to the clients.

The SLA Formulation Service module 204 may accept as input one or more mission objectives 210 and may formulate one or more objective functions. The objective function may represent one or more objectives of resource allocation and may represent the system's ability to achieve optimal resource allocation with given input parameters under a set of constraints. The objective function may maximize QoS performance metrics achieved by an optimal resource allocation. The SLA Formulation Service module 204 may also formulate one or more objective values, for example desired output values of the objective function that the system is expected to deliver for the mission. The Resource Manager Service module 212 may manage resource allocation and utilization. The Resource Manager Service module 212 may implement one or more optimization algorithms to attain optimal resource utilization, for example to maximize the value of one or more objective functions subject to one or more constraints.

Figure 2B:
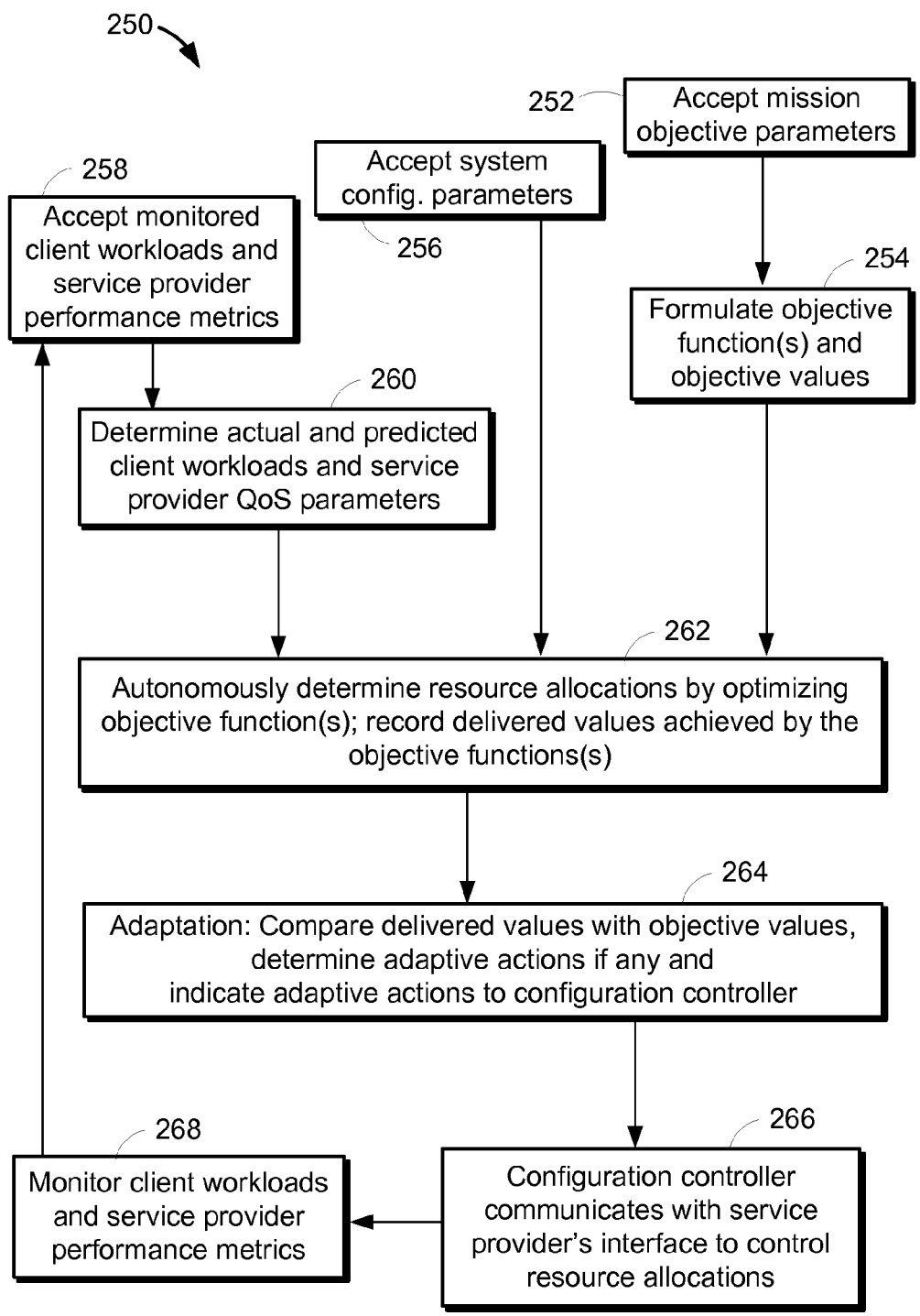
FIG. 2B depicts a flow diagram that shows example steps in the operation of an example system for mission-driven autonomous and adaptive resource management, in accordance with one or more embodiments of the present disclosure.

Some embodiments of the present disclosure may be realized in a method for mission-driven autonomous and adaptive resource management, utilizing a QoS-managed system. FIG. 2B depicts a flow diagram that shows example steps in the operation of an example system for mission-driven autonomous and adaptive resource management, in accordance with one or more embodiments of the present disclosure. Referring to the system 200 of FIG. 2A and the flow diagram 250 of FIG. 2B as one example, at step 252, a SLA Formulation Service module 204 may accept as input one or more mission objectives 210. At step 254, the SLA Formulation Service module 204 may formulate one or more objective functions and one or more objective values. At step 256, a Resource Manager 212 may accept as input system configurations 208. Resource Manager 212 may also accept as input the objective functions and actual and predicted information from a prediction service module 214, including actual and predicted client workloads and service provider performance metrics. In some embodiments, to adapt the prediction service module 214 to send information to the resource manager 212, at step 258, the Prediction Service module 214 may accept as input monitored client demands/workloads and monitored performance metrics provided by one or more monitoring service modules, for example the Workload Monitoring Service module 216 and the Performance Monitoring Service module 217. At step 260, the Prediction Service module 214 may determine, among other things, actual and predicted workload of the clients and service provider performance metrics. At step 262, the Resource Manager 212 may autonomously optimize the one or more objective functions utilizing one or more optimization algorithms to attain optimal resource utilization. The resource manager may pass outputs from the optimization process to one or more other services. The resource manager may pass resource allocation assignments to the configuration controller 206 and pass delivered resource allocation values to the adaptation service module 222. At step 264, the Adaptation service module 222 may compare actual delivered values (from the resource manager) to objective values (from the establishment service module) and may select from one or more adaptive strategies, mechanisms and/or algorithms and may instruct the Configuration Controller 206 to take adaptive action. At step 266, the configuration controller 206, based on signals from the resource manager and the adaptation service may communicate and/or indicate the optimized/modified resource allocations to the service providers, such that the service providers may implement the resource allocations to process client demands. A QoS-managed system may continuously monitor (shown at step 268) client workloads, service provider performance metrics, and mission objectives and may continuously execute some or all of the steps of FIG. 2B to adapt to and/or handle variations in these inputs.

In some embodiments of the present disclosure, the SLA Formulation Service module 204 may formulate one or more objective functions that may allow for the autonomous determination of optimal allocation of resources. In some embodiments, an objective function may be formulated that allows for the determination of maximum resource allocation relative to a best effort resource allocation (sometimes referred to as the relative-to-best-effort objective function). The objective function may utilize unique expressions of mission objectives, client QoS requirements and outcomes. The objective function may be designed to handle variations in mission objectives, system architectures, and usage/performance scenarios. The objective function may utilize a tolerance factor $\alpha$, which constrains desired delays of all applications/services to be less than the bounds defined as $(1+\alpha)$ times of the corresponding delays in a best effort approach. A tolerance factor $\alpha$ is a non-negative real number and defines a range of acceptable performance parameters. For example, a tolerance factor 0.25 may place constraints on objective parameters (e.g., response time$\leq(1+0.25)*D$, where D is a best effort delay bound).

In some embodiments, the relative-to-best-effort objective function may be expressed by the following mathematical problem. Minimizing Eq. 1 below will maximize a related function (described more later) that represents the total delivered value of the system. Therefore, minimizing Eq. 1 may optimize the total delivered value of the system.

$$\sum_{i=1}^{n} \frac{v_i}{\mu w_i - \lambda_i} \qquad \text{(Eq. 1)}$$

In Eq. 1, $v_i$ may be calculated as follows by Eq. 2.

$$v_i = G(I_i, U_i)(\mu w_i^B - \lambda_i) \qquad \text{(Eq. 2)}$$

Eq. 1 may be subject to the following constraints (Constr. 1, 2).

$$\Sigma_{i=1}^{n} w_i = 1 \qquad \text{(Constr. 1)}$$

$$a_i \leq w_i \leq b_i \text{ for } i=1, \ldots, n \qquad \text{(Constr. 2)}$$

In the above mathematical problem (Eq. 1, 2 and Constr. 1, 2), $I_i$, $U_i$ and $\lambda_i$ are the importance, urgency, and arrival rate for a client demand of type i. Terms $\mu$, $w_i^B$, $a_i$ and $b_i$ are known or calculated parameters, where $\mu$ represents the rate at which the service provider can process requests for all demands (also referred to as throughput). The term $\mu$ may correspond to the processing power of the service provider, where, for example, a service provider with a more powerful processor may process more demands per second than a service provider with a weaker processor. Additionally, $w_i^B$ represents the weight (i.e., the fraction of server processing capacity) devoted to demands of type i utilizing a best effort resource allocation approach, $a_i$ represents a constant derived from other input parameters and a tolerance factor (explained more below), and $b_i$ represents the client's receiving capacity for demands of type i. Finally, $w_i$ represents the optimal weight (i.e., the fraction of server processing capacity) devoted to demands of type i as determined by a QoS-managed system, for example one or more of the systems described herein, for example a system similar to system 200 of FIG. 2A. In some examples, a service provider may include a demand queue for each type of demand, and a weight may be determined for each queue, to handle the requests in that queue. Accordingly, for each type of demand, $I_i$, $U_i$, $\lambda_i$, $\mu$, $w_i^B$, $a_i$ and $b_i$ are important input/system parameters, and in some embodiments, their values are selected, known, calculated or assumed before the optimization/maximization process starts. In addition, the $w_i$'s are variables whose values are to be determined as the output/result of the optimization process. In fact, the goal of some of the resource allocation algorithms discussed herein is to find assignments for the $w_i$'s to achieve maximum total delivered values for the objective functions and/or the QoS-managed system.

Before describing the process by which a relative-to-best-effort objective function may be solved (and total delivered value of a system optimized), it may be helpful to describe how the mathematical equations above with regard to the best effort approach may be derived. In some embodiments, client demands for resources may be categorized as one of n types. For example, three types of demands may be email messages, streaming video and chat messages. A service provider may be Operable to handle many clients of each type of demands.

Each type of demands may have an associated pair of QoS requirements established by the client, $I_i$ (Importance) and $U_i$ (Urgency), which allow the system to prioritize the processing of demands. Importance and urgency values may be derived automatically by/from the client process, or they may be configured by QoS policies. This unique two-dimensional expression of client QoS requirements (importance and urgency values) offers more options and flexibility in satisfying mission objectives than a one-dimensional approach (e.g., by priority) used by current systems. Each demand type also has an associated expected arrival rate $\lambda_i$ that indicates the average rate at which demands of type i arrive at/enter the service provider. The expected arrival rate may be derived by monitoring client demands during operations, for example, by tracking the demands that arrive at the service provider over a period of time. The expected arrival rate may also be derived from historial logs. Hence, each demand type i may be characterized by an arrival rate, an importance value, and an urgency value: $[\lambda_i, I_i, U_i]$, and the total demands on the system may be represented by the following matrix (Eq. 3).

$$\begin{bmatrix} \lambda_1, I_1, U_1 \\ \lambda_2, I_2, U_2 \\ \ldots \\ \lambda_n, I_n, U_n \end{bmatrix}$$ (Eq. 3)

Therefore, an objective function may be formulated based on the inputs/parameters discussed above, aggregated across all types of demands (i=1, . . . , n). Such an objective function (Eq. 4) is shown below, where f represents the total delivered value of the system.

$$f = \sum_{i=1}^{n} G(I_i, U_i) \frac{T_i^B - T_i^Q}{T_i^B}$$ (Eq. 4)

G is a monotonic function, meaning its value does not decrease if none of its parameter values decrease. Examples of monotonic G(I, U) functions may be I*U (i.e., I multiplies U) or the square root of I*U. $T_i^B$ and $T_i^Q$ are the response time in a best effort solution and the response time in the QoS-managed optimal solution for the $i^{th}$ demand type, respectively. A response time may be the period of time starting when a demand of type i enters the service provider and ending when the service provider finishes processing the demand, and perhaps initiates a response to the client. In some examples, a service provider may include a demand queue for each type of demand, and the response time may depend on how many demands back up in a demand queue. A general equation may be established that represents response time, $T_i$. Then, response time terms in Eq. 4 may be substituted with expanded representations of response time. Assuming an application server serves all demands at a rate of $\mu$, the response time $T_i$ for the demands of type i can be calculated by the following equation, where $\mu*w_i$ (i.e., $\mu$ multiplies $w_i$) is the rate at which the application server serves demands of type i and $\lambda_i$ is the arrival rate of the demands.

$$T_i = \frac{1}{\mu w_i - \lambda_i}$$ (Eq. 5)

Substituting the general $T_i$ representation of Eq. 5 into $T_i^B$ and $T_i^Q$ in Eq. 4 results in the following representation of the total delivered value f (Eq. 6). Note, for simplicity, any terms that work out to $w_i^Q$ may be represented as simply $w_i$.

$$f = \sum_{i=1}^{n} G(I_i, U_i) - \sum_{i=1}^{n} G(I_i, U_i) \frac{\mu w_i^B - \lambda_i}{\mu w_i - \lambda_i}$$ (Eq. 6)

Here, $w_i^B$ and $w_i$ are the weights for the $i^{th}$ type of demands for the best effort solution and the QoS managed optimal solution, respectively. To formulate the relative-to-best-effort objective function, a best effort or fair sharing algorithm, like round robin, may be used to compute $w_i^B$, in which case $w_i^B=1/n$, for i=1, 2, . . . n. In other embodiments of the present disclosure, for example to accommodate differences in arrival rates $\lambda_i$, a different equation may be used to compute $w_i^B$, for example, $w_i^B=\lambda_i/\Sigma\lambda_i$ for i=1, 2, . . . n. The formulation represented by Eq. 6 for the resource allocation problem may be referred to as a relative-to-best-effort problem formulation.

Essentially, Eq. 6 may be the final formulated relative-to-best-effort objective function for the system representing total delivered value relative to a best effort resource allocation. In some embodiments, a main goal of the QoS-managed system may be to optimize the allocation of resources by maximizing this equation. However, Eq. 6 can be simplified to aid in the optimization process. Based on Eq. 6, it will become apparent to one of skill in the art that the problem of maximizing f is equivalent to the problem of minimize f' in the following equation (Eq. 7).

$$f' = \sum_{i=1}^{n} G(I_i, U_i) \frac{\mu w_i^B - \lambda_i}{\mu w_i - \lambda_i}$$ (Eq. 7)

In Eq. 7, a term $v_i$ may be introduced whose value is calculated as shown in Eq. 8 below. All parameters in $v_i$ may be known and thus $v_i$ may be considered a constant in the optimization. Substituting $v_i$ into Eq. 7 results in a more simplified equation as shown by Eq. 9 below.

$$v_i = G(I_i, U_i)(\mu w_i^B - \lambda_i) \quad \text{(Eq. 8)}$$

$$f' = \sum_{i=1}^{n} \frac{v_i}{\mu w_i - \lambda_i} \quad \text{(Eq. 9)}$$

One or more constraints may be imposed on the input parameters of Eq. 9 during the optimization process. Constraints may ensure that inputs/parameters conform to certain requirements and/or desires, for example a constraint may ensure that total allocated resources equal the total available resources. Constraints may ensure that inputs/parameters conform to certain parameters configured by a system administrator, for example to meet certain performance goals. Accordingly, Eq. 9 may be subjected to the following constraints (Constr. 3-5).

$$\sum_{i=1}^{n} w_i = 1 \quad \text{(Constr. 3)}$$

$$T_i^Q \leq (1+\alpha)T_i^B \quad \text{(Constr. 4)}$$

$$w_i \leq b_i \quad \text{(Constr. 5)}$$

Regarding Constr. 3, because $w_i$, represents a fraction of the server/resource capacity (devoted to demands of type i), the total of all the fractions should add up to 1. Regarding Constr. 4, $\alpha$ is a non-negative control parameter, for example referred to as a tolerance factor, whose value may be determined before the optimization starts. A tolerance factor may define a range of acceptable performance parameters. In some examples, the tolerance factor may be set such that $\alpha=0.5$. In some examples, a tolerance factor may place constraints on objective parameters (e.g., response time≤1.25*threshold for a tolerance factor 25%). Regarding Constr. 5, this constraint ensures that the allocated resource to a client does not exceed the total of the clients' capacity for receiving data from the service provider.

Expanding Constr. 4 based on the general response time ($T_i$) equation (Eq. 5) results in the following modified constraint (Constr. 6).

$$w_i \geq \frac{\mu w_i^B + \alpha \lambda_i}{\mu + \alpha \mu} = a_i \quad \text{(Constr. 6)}$$

In one example, it can be seen from Constr. 6 that when $\alpha=0$, the optimal solution results in $w_i = w_i^B$ for i=1, 2, ..., n, meaning that the optimal weight is equal to the best effort/fair share weight (and as such, the delivered value of an optimal allocation is the same as that of a best effort/fair share allocation). Therefore, $\alpha$ plays a key role in QoS-managed system to deliver better performance than best effort solutions in consideration of the differences in the importance and urgency values of clients' demands. Note that $a_i$ is a constant calculated from other input parameters, including a tolerance factor $\alpha$, as shown in Constr. 6. Accordingly, $a_i$ may be calculated/determined before the optimization problem begins.

At this point, the original relative-to-best-effort objective function (and related constraints) have been derived—[Eq. 9, Constr. 3, 5 6] compared to [Eq. 1, Constr. 1, 2]. The relative-to-best-effort objective function does not require an input specifying any constraints' on the response time for each type of demands (sometimes referred to as delay bounds). Nor does the relative-to-best-effort objective function require an input specifying the amount of resources (e.g., minimal and maximal) for each type of demands. The relative-to-best-effort objective function instead utilizes QoS management to optimize resource allocations (weight assignments) to achieve the best performance (maximum value of the objective function f) relative to the best effort resource allocation solutions. The control parameter a may be critical for QoS management for delivering best performance possible.

After formulating an objective function and related constraints, the goal of an autonomous and adaptive resource management system (QoS-managed system) may be to optimize the objective function to achieve the highest delivered value, based on concurrent demands, system performance, available resources and mission objectives. In some embodiments of the present disclosure, a resource manager, for example the Resource Manager Service module 212 of FIG. 2A, may find resource allocations, for example by finding values to $w_i$ in Eq 9, that optimize a relative-to-best-effort objective function, for example using an iterative approach, sometimes referred to as the core algorithm.

FIG. 3 depicts a flow diagram 300 that shows example steps in the operation of an example QoS-managed system, for example steps executed by a resource manager, in accordance with one or more embodiments of the present disclosure. In some embodiments of the present disclosure, the core algorithm for optimizing the relative-to-best-effort objective function with only lower bound constraints ($a_i \leq w_i$) may consist of one or more of the steps depicted in FIG. 3, and perhaps additional steps. In some examples, these steps guarantee that an optimal solution will be obtained because the optimization problem is a convex optimization problem, and, as such, a feasible solution to the Karush-Kuhn-Tucker (KKT) conditions provides an optimal solution to the optimization problem. In these examples, $\Sigma a_i \leq \Sigma w_i = 1$, and as such, it may be proved that there is always a feasible solution to the KKT conditions. (If $\Sigma a_i = 1$ then the optimal solution is for $w_i = a_i$ for all i.) For example, the KKT conditions for the relative-to-best-effort objective function with lower bound constraints may be shown by Eq. 10 to Eq. 14 below.

$$\frac{-v_i \mu}{(\mu * w_i - \lambda_i)^2} - \gamma_i + \theta = 0 \text{ for } i = 1, \ldots, n \quad \text{(Eq. 10)}$$

$$a_i \leq w_i \text{ for } i=1, \ldots, n \quad \text{(Eq. 11)}$$

$$\sum_{i=1}^{n} w_i = 1 \quad \text{(Eq. 12)}$$

$$\gamma i^*(w_i - a_i) = 0 \text{ for } i=1, \ldots, n \quad \text{(Eq. 13)}$$

$$\gamma i \geq 0 \text{ for } i=1, \ldots, n \quad \text{(Eq. 14)}$$

Referring to FIG. 3, at step 302, a set S may be initialized as {1, 2, ..., n} and a variable ω may be initialized as 1. The set S denotes and includes a set of indices of demand types whose weights have not been set to final values. Members may be removed from set S during the execution of the core algorithm, when the corresponding weight ($w_i$) of the demand type has been set to a final value. The variable ω denotes the total available fraction of resources to be allocated to all demands whose indices are in set S. The value of ω may change during the execution of the core algorithm, when and/or if members are removed from set S.

At step 304, the core algorithm may begin a main loop that ends when the optimal solution is found (step 308), meaning all weights are set to their final values. At step 304, for each demand type whose index is in set S, an initial value is assigned to weight $w_i$ as shown in Eq. 15 below. Eq. 15 may be derived by utilizing the KKT conditions to solve for an optimal solution by setting $\Sigma_{i \in S} w_i = \omega$ and $g_i(w_i) = g_j(w_j)$ for all i, j∈S. The function $g_i(w_i)$ is the negative of the derivative (with respect to the weight variable $w_i$) of the objective function for i∈S, as defined in Eq. 16 below. The value assigned to $w_i$ may change in subsequent steps of algorithm 300.

$$w_i = \frac{\lambda_i}{\mu} + \frac{\sqrt{v_i}}{\sum_{j \in S} \sqrt{v_j}} \left( \omega - \frac{\sum_{j \in S} \lambda_j}{\mu} \right)$$ (Eq. 15)

$$g_i(w_i) = \frac{v_i \mu}{(\mu * w_i - \lambda_i)^2}$$ (Eq. 16)

At step 306, the algorithm may test whether all weights assigned in step 304 satisfy their lower bound constraints. One or more tests may ensure, for example, that index i (of weight $w_i$ for the demand type) is still in set S and the lower bound for $w_i$ is $a_i$. If the result of test 306 is positive ("Yes" or "Y"), the algorithm 300 may end at step 308. If the algorithm ends at step 308, the current weight assignments (m) may constitute an optimal solution. The optimality of the solution may be proved using the dual variables in KKT conditions as defined in Eq. 17 and Eq. 18 below.

$$\theta = g_i(w_i), \gamma_i = 0 \text{ for } i \text{ with } w_i > a_i$$ (Eq. 17)

$$\gamma_i = \theta - g_i(a_i) \geq \theta \text{ for } i \text{ with } w_i = a_i$$ (Eq. 18)

If the result of test 306 is negative ("No" or "N"), the algorithm 300 may begin a sub-loop at step 310 that iterates through all indices remaining in S to recalculate weights whose assigned values ($w_i$'s assigned by Eq. 10) do not satisfy their respective lower bound constraint.

At step 312, the sub-loop may be initiated, for example, using the variable k to loop over the indices in S. K is initialized to 1 and m is initialized to the total number of indices in set S. At step 314, variable i may be set to the $k^{th}$ index in set S. At step 316, the sub-loop may determine whether $w_i$ is less than or equal to its lower bound $a_i$. If this comparison 316 is true ("Yes" or "Y"), the weight $w_i$ may be assigned a final value $a_i$ at step 318. At step 320, the index i may be removed from S and the value of $\omega$ may be reduced by $w_i$. At step 322, the loop variable k for the sub-loop may be increased by one to address the next index in S in the next iteration. At step 324, the algorithm may check whether there are still more indices in S to be checked in the sub-loop. If this comparison 324 is true ("Yes" or "Y"), the algorithm may go back to step 314 to check $w_i$ in a subsequent iteration. If comparison 324 is false ("No" or "N"), the algorithm may break the sub-loop 310, go back to step 304 and continue the main loop until an optimal solution is found in step 308.

It may be proved that the algorithm depicted in FIG. 3 has found an optimal solution by using the KKT equations and the following two facts: (1) For any index i of the demand types, $g_i(w_i)$ decreases when the value of $w_i$ increases according to Eq. 16 above; (2) For any two indices i and j of two demand types, if $w_i$ is assigned in an optimal solution to its lower bound value $a_i$, and $w_j$ is assigned in an optimal solution to a value greater than its lower bound $a_j$, then $g_i(w_i) \leq g_j(w_j)$ according to Eq. 10 above. If an optimal solution is found at step 308 right after step 306 is executed for the first time, the values assigned to all $w_i$'s provide a solution to the KKT conditions with all dual variables $\gamma_i$ set to 0. If an optimal solution is found at step 308 after step 306 is executed more than once, a variable p may represent the number of times step 306 is executed during the main loop. A set $L^{(p)}$ may be defined to include all indices k where $w_k$ was set to $a_k$ at step 318 in the $p^{th}$ iteration of the main loop. A set $S^{(p)}$ may be defined to include all indices k in the set S at step 304 in the $p^{th}$ iteration of the main loop. As one example, consider the case where an optimal solution is found at step 308 after step 306 is executed twice. For any i, j in $S^{(2)}$, $w_i^{(2)} \leq w_i^{(1)}$ This fact results because $g_i(w_i^{(1)}) = g_k(w_k^{(1)})$ and $g_i(w_i^{(2)}) = g_k(w_k^{(2)})$ for all i, k∈$S^{(2)}$ so that all $w_i^{(2)}$ for i∈$S^{(2)}$ either increase or decrease. Because $\Sigma_{i \in S^{(2)}} w_i^{(1)} > \Sigma_{i \in S^{(2)}} w_i^{(2)}$ they must all decrease. As a result, $g_i(w_i^{(2)}) \geq g_i(w_i^{(1)}) \geq g_j(a_j)$ for all i∑$S^{(2)}$ and for all j∑$L^{(1)}$, where the second inequality is due to fact 1 and that $g_i(w_i^{(1)}) = g_k(w_k^{(1)})$ for all i, k∈$S^{(1)}$, so that the solution and corresponding dual variables listed in Eq. 17 and 18 satisfy the KKT conditions. It may become clear that the analysis may continue in the same way as described above if more iterations of the main loop of the algorithm are needed before the optimal solution is found. The algorithm is guaranteed to stop with an optimal solution because S decreases in size at each iteration of the main loop and because all the remaining weight of $\omega$ is allocated at each iteration.

In some embodiments of the present disclosure, steps in FIG. 3 can be modified to find optimal solutions to the relative-to-best-effort objective functions with only upper bound constraints ($w_i \leq b_i$). For example, step 306 and 316 can be changed to compare the current assignment of $w_i$ to the upper bound $b_i$, and step 318 can be changed to reassign the $w_i$ to the upper bound $b_i$. The modified algorithm may similarly be proved to find the optimal solution to the problem with only upper bound constraints.

In some embodiments of the present disclosure, a constraint on the response time for each type of demands (sometimes referred to as delay bounds) may be given, meaning delay bounds may be specified as part of the input parameters. This may change the objective function when compared to the relative-to-best-effort objective function explained above, and one or more of the constraints. When the delay for each type of demands is bound respectively to the delay of that type in a best effort resource allocation, the optimal solution to the objective function represents an optimal resource allocation relative to the best effort resource allocation. In that case, solving the objective function achieved the highest delivered value (maximum f) to the concurrent demands on the system while the worst case scenario for each type was constrained relative to a best effort resource allocation strategy. Alternatively, when a delay bound is given explicitly (as $D_i$) for each type of demands, solving the objective function achieves the highest delivered value (maximum f) to the concurrent demands on the system that satisfy additional constraints ($D_i$'s), as shown below.

When the delay bounds are explicitly given, the delivered value function f (also referred to as the delay-bounds objective function) may be transformed (when compared to Eq. 6) as shown below by Eq. 19 below. $D_i$ is the delay bound for each type of demands. The formulation represented by Eq. 19 for the resource allocation problem may be referred to as a relative-to-delay-bound problem formulation.

$$f = \sum_{i=1}^{n} G(I_i, U_i) - \sum_{i=1}^{n} G(I_i, U_i) \frac{1}{(\mu w_i - \lambda_i) D_i}$$ (Eq. 19)

Essentially, Eq. 19 may be the final formulated equation for the system representing total delivered value constrained by given delay bounds. In some embodiments, a main goal of the QoS-managed system may be to optimize the allocation of resources by maximizing this equation. However, Eq. 19 can be simplified to aid in the optimization process. It will become apparent to one of skill in the art that the problem of maximizing f in Eq. 19 is equivalent to the problem of minimize f' in the following equation (Eq. 20).

$$f' = \sum_{i=1}^{n} G(I_i, U_i) \frac{1}{(\mu w_i - \lambda_i) D_i} \quad \text{(Eq. 20)}$$

In Eq. 20, a term $v_i$ may be introduced whose value is calculated as shown in Eq. 21 below. Substituting the $v_i$ into Eq. 20 results in a more simplified equation as shown in Eq. 22 below.

$$v_i = G(I_i, U_i)/D_i \quad \text{(Eq. 21)}$$

$$f' = \sum_{i=1}^{n} \frac{v_i}{\mu w_i - \lambda_i} \quad \text{(Eq. 22)}$$

Additionally, one or more of the constraints on the objective function may be transformed, when compared to the best effort solutions. Referring to the relative-to-best-effort problem formulation Constr. 4, $T_i^B$ may now be replaced with the given delay bound ($D_i$), resulting in Constr. 7 below. Expanding Constr. 7 based on the general response time ($T_i$) equation results in the modified constraint, Constr. 8.

$$T_i^Q \le (1+\alpha) D_i \text{ for } i=1, \ldots, n \quad \text{(Constr. 7)}$$

$$w_i \ge \frac{1 + (1+\alpha) D_i \lambda_i}{(1+\alpha) D_i \mu} = a_i \quad \text{(Constr. 8)}$$

Therefore, this problem is essentially reduced to the same problem as the relative-to-best-effort problem formulation. The constants $v_i$ (in Eq. 22) and $a_i$ (in Constr. 8) may be calculated from the input parameters in this problem differently than those in the relative-to-best-effort problem formulation. An optimal solution to this problem may be obtained utilizing the same core algorithm for the relative-to-best-effort problem formulation (depictions of FIG. 3 and related description).

In some embodiments of the present disclosure, the systems, methods, routines and/or techniques described herein for dynamically allocating server resources to meet changing demands may be applied to a cloud data center scenario. A cloud data center often segregates services into multiple logical partitions according to their types and owners. For example, hosted email applications of one company (owner) are in one partition; while hosted web applications of another company (owner) are in another partition. Cloud-based services may be applications deployed on servers allocated for each partition and each application could have multiple instances to support multiple demands for the same service. The QoS-managed system may take these issues into consideration in resource allocation.

Figure 4:
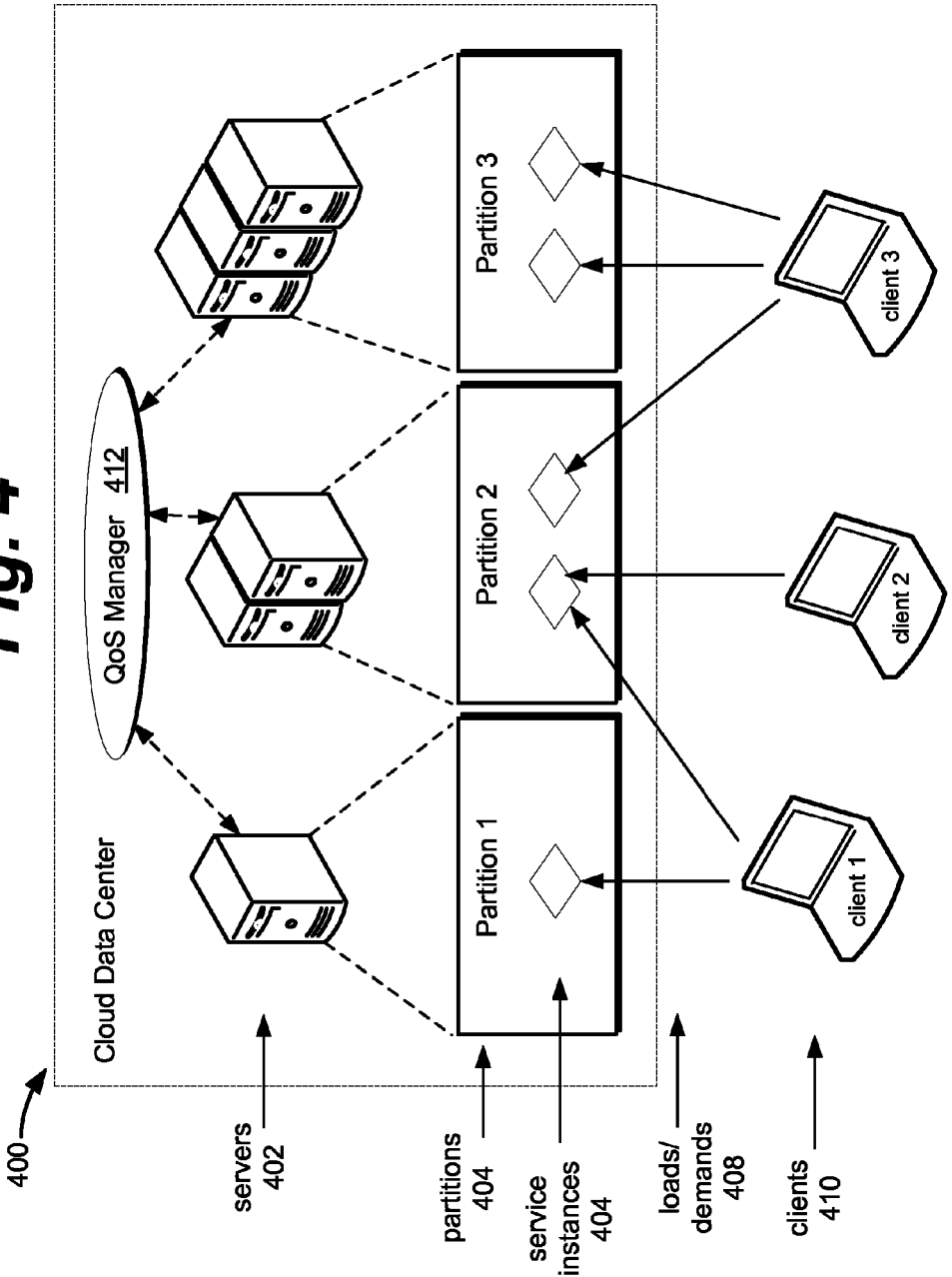
FIG. 4 depicts an illustration of a block diagram showing an example cloud data center setup that may utilize a system for mission-driven autonomous and adaptive resource management, according to one or more embodiments of the present disclosure.

FIG. 4 depicts an illustration of a block diagram showing an example cloud data center setup 400 that may utilize a system for mission-driven autonomous and adaptive resource management (MAARM), according to one or more embodiments of the present disclosure. FIG. 4 also shows the relationships between servers 402, partitions 404, service instances 406, loads/demands 408, clients 410 and Cloud QoS Manager 412. In one example, a cloud data center may include s servers and a total of p partitions, where each partition may host one or multiple application/service instances. The s servers may be referred to as a cluster, for example because they may appear as one entity that is adapted to handle client demands. The s servers may be allocated to the p partitions by a QoS manager. It should be understood that a variety of assignments between partitions and servers may exist for any given server cluster. For example, a server can be shared through virtualization by multiple partitions, or multiple servers may combine to provide a single partition. Additionally, not all of the s servers need to be allocated to a partition. In some situations, one or more servers may remain on "standby," for example, in the case where the demands are low, i.e., $\Sigma \lambda_{ij}$ is far smaller than $\mu^A = \Sigma \mu_k$ (see variable and equation definitions below).

Each partition (for example hosting an application/service) may support multiple demands from clients, and each demand may be one of n demand types, each demand type having load characteristics. In some examples, each server may use a Weighted Fair Queuing (WFQ) based scheduling algorithm to handle the requests. In one example, the servers may include multiple queues, for example one queue devoted to each type of demands. In some examples, each application/service can be replicated in multiple instances within a partition. In these examples, the multiple instances of a service may appear to clients as a single service, but the multiple instances may allow a partition to distribute demands for the service to address a high volume of client demands. Therefore, each partition may have m instances of a virtual application/service. For each partition's objective function, $\mu_j^p$ (the partition j's capacity) may be used as the general throughput parameter $\mu$, and [($\lambda_{1j}/m$, $I_{1j}$, $U_{1j}$), ($\lambda_{2j}/m$, $I_{2j}$, $U_{2j}$), ..., ($\lambda_{nj}/m$, $I_{nj}$, $U_{nj}$)] may be used as the demand characteristics (request arrival rate, importance and urgency) on each service instance. Since m instances of the application are assumed to be perfectly load-balanced, the demands on each instance would be 1/m of the total demands from the clients and hence the notion of $\lambda_{ij}/m$ as the arrival rate of demands on an instance.

Client demands may be categorized into n types. Assume that client demands arrive at the servers at an arrival rate of $\lambda_{ij}$—the arrival rate for the $i^{th}$ type of demand on the $j^{th}$ partition's service. Then, the demands on the system are represented by the following matrix (Eq. 23).

$$\begin{bmatrix} (\lambda_{11}, I_{11}, U_{11}), (\lambda_{12}, I_{12}, U_{12}), \ldots, (\lambda_{1p}, I_{1p}, U_{1p}) \\ (\lambda_{21}, I_{21}, U_{21}), (\lambda_{22}, I_{22}, U_{22}), \ldots, (\lambda_{2p}, I_{2p}, U_{2p}) \\ \ldots \\ (\lambda_{n1}, I_{n1}, U_{n1}), (\lambda_{n2}, I_{n2}, U_{n2}), \ldots, (\lambda_{np}, I_{np}, U_{np}) \end{bmatrix} \quad \text{(Eq. 23)}$$

In some situations, for example when n=p and the demands of the $i^{th}$ type is sent to and processed by application instances in the $j^{th}$ partition, the matrix will be diagonal, i.e., ($\lambda_{ij}$, $I_{ij}$, $U_{ij}$)=(0, 0, 0) for i≠j. Also, it may be assumed that a request of the same type of demands ($\lambda_{ij}$, $I_{ij}$, $U_{ij}$) requires an equal amount of server processing resources on average. Extension to this assumption may be implemented by adjusting service rates for a type of demands.

One approach to formulate a resource allocation problem in the cloud data center scenario is to apply a supply-based approach. For example, a term $\mu_k$ may be the maximum throughput (i.e., processing rate) of a server k, for k=1, 2, ..., s. It may be assumed that client demands are processed by s servers that are perfectly load balanced. Therefore, the maximum throughput of the server cluster (all servers s) may be computed according to Eq. 24 below.

$$\mu^A = \Sigma \mu_k \text{ for } k=1,2,\ldots,s \quad \text{(Eq. 24)}$$

It should be understood that a server cluster may also be referred to generally as an application server or a service provider, even though an application server may actually include one or more physical servers. In some example, all servers s in the cluster may be homogeneous (equal processing rates). In this case, $\mu_1 = \mu_2 = \ldots = \mu_s = \mu$ for s homogeneous servers, and the throughput equation of the server cluster may be simplified to $\mu^A = s*\mu$.

The QoS characteristics of a partition can be aggregated from the QoS characteristics of the service instances running on the partition. Similarly, the demands on a partition can be aggregated from the demands on the service instances running on the partition. The total capacity of the server cluster (s servers) is the total of the available resources across all partitions. Therefore, the resource allocation problem in the cloud data center scenario may apply a two-step resource allocation process, where each step utilizes a resource allocation problem that is similar to the relative-to-best-effort problem formulation, explained above. In this regard, each resource allocation problem may utilize an objective function that may represent a total delivered value f. The first step may maximize delivered value cloud-wide, by assigning optimal weights to partitions in accordance with the demands on the partitions. The second step may maximize delivered value partition-wide, by assigning optimal weights to service instances within a partition in accordance with demands on the service instances.

Regarding the first step of the cloud center resource allocation problem, the first step may allocate an optimal amount of server cloud power $\mu^A$ to each partition according to the characteristics of the demands on the partitions (i.e., arrival rate, importance and urgency values). One goal of the first step may be to optimally partition the total server cloud throughput $\mu^A$ into fractions $w_i*\mu^A$, where $w_i$ is the weight (fraction of throughput, between 0 and 1) for each partition i, where i=1, 2, ..., p. In some embodiments, before the first step begins, a pre-processing step may select a subset of s servers to participate in the resource allocation problem, for example disqualifying servers that are on standby.

Figure 5B:
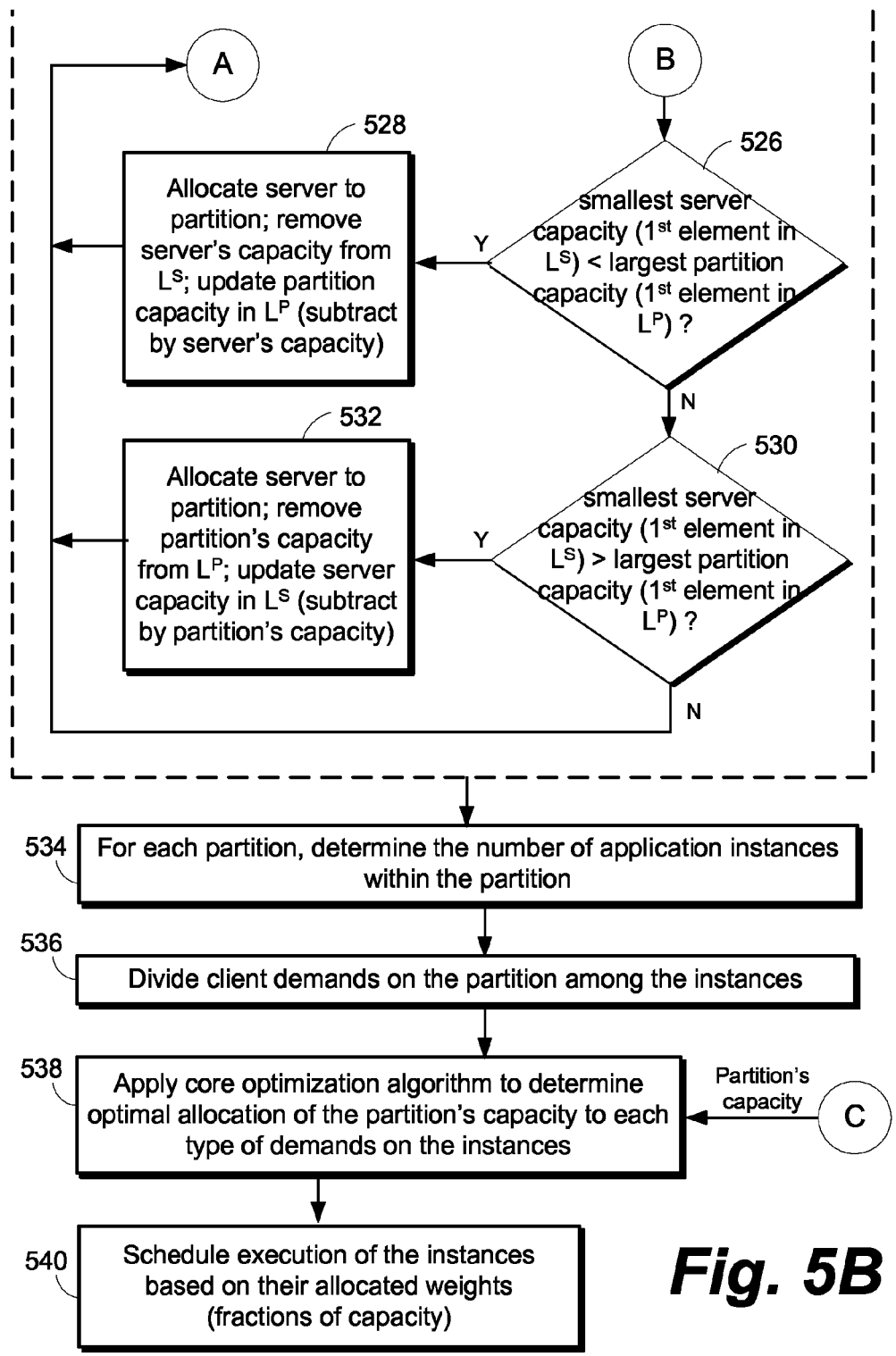
FIG. 5B depicts a flow diagram that shows example steps in the operation of an example system for mission-driven autonomous and adaptive resource management, for example steps executed by a resource manager, in accordance with one or more embodiments of the present disclosure.

FIG. 5A and FIG. 5B depict a flow diagram 500 that shows example steps in the operation of an example QoS-managed system, for example, steps executed by a resource manager to solve the cloud data center resource allocation problem, in accordance with one or more embodiments of the present disclosure. In some embodiments of the present disclosure, the cloud data center resource allocation problem may be solved in two steps. The first step may allocate server resources to partitions, and the second step may allocate the resources for a partition to application instances in the partition. The first step of the cloud data center resource allocation problem may use an algorithm that may consist of one or more of the steps depicted in FIGS. 5A and 5B, and perhaps additional steps.

Referring to FIG. 5A, at step 502, the algorithm may start with receiving input on configuration parameters including number of servers s, number of partitions p, and the capacities of the servers as a generalized service rate, $\mu_k$, for k=1, 2, ..., s. At step 504, the algorithm may aggregate the total capacity of the servers as the summation of the individual server capacities. At step 506, the algorithm may receive input on the characteristics of client demands including types, to which partitions they are allocated, and QoS characteristics (importance and urgency). At step 508, the demands may be sorted by partitions and by types, for example, organized in a matrix (Eq. 23) $[(\lambda_{ij} I_{ij} U_{ij})]$ for i=1, 2, ..., n, j=1, 2, ..., p. At step 510, the algorithm may aggregate demands for each of the p partitions of the server cluster by summing up the demands $(\lambda_{ij} I_{ij} U_{ij})$ for i=1, 2, ..., n for each partition j. This can be achieved by adding all elements in each column of the matrix (Eq. 23) to determine aggregated arrival rate, importance, and urgency values for each partition. The resulting matrix is $[(\lambda_1 I_1 U_1), (\lambda_2 I_2 U_2), \ldots, (\lambda_p I_p U_p)]$ for demands on partition 1 through partition p. At this point, the first step of the cloud center resource allocation problem may be reduced to a problem formulation that is similar to the relative-to-best-effort problem formulation described earlier in this disclosure.

At step 512, the algorithm may solve an optimization problem, similar to the relative-to-best-effort optimization problem, where $\mu^A$ may be used as the general throughput parameter $\mu$, and $[(\lambda_1 I_1 U_1), (\lambda_2 I_2 U_2), \ldots, (\lambda_p I_p U_p)]$ may be used as the demand characteristics on each partition, like the demand characteristics for types of demands in the relative-to-best-effort problem formulation. To solve the optimization problem, a core optimization algorithm similar to the one used in the relative-to-best-effort problem formulation (depictions of FIG. 3 and related description) may be applied to obtain optimal allocation weights $[w_1, w_2, \ldots, w_p]$, which may represent fractions of the total server capacity applied to each partition. The share of server cluster capacity allocated to partition j may then be calculated as $\mu_j^P = w_j*\mu^A = w_j*\Sigma\mu_k$ for j=1, 2, ..., p.

At step 514, the algorithm may determine which servers should be allocated to which partitions. This step may be possible because the amount of resources allocated to each partition has been determined in previous steps. Given the s servers with $[\mu_1, \lambda_2, \ldots \mu_s]$ capacities, one requirement at this step 514 may be to allocate the s servers to partitions with capacities $\mu_j^P = w_j*\mu^A$ for j=1, 2, ..., p. One goal, or sub-goal, may be to minimize the number of times a server is allocated to more than one partition. For example, it may be desirable to minimize the chance of one server being partially allocated to one partition (utilizing a fraction of the server's capacity) and partially allocated to another partition (utilizing another fraction of its capacity). Step 514 may include one or more of the sub-steps 516, ..., 524 depicted in FIG. 5A and sub-steps 526, ..., 532 depicted in FIG. 5B, and perhaps additional sub-steps.

At step 516, the shares of server cluster capacity allocated to each partition j ($\mu_j^P = w_j*\mu^A$) may be formed into a list and sorted in descending order, creating an ordered list $L^P$. Additionally, servers capacities $[\lambda_1, \mu_2, \ldots, \lambda_s]$ may be formed into a list and sorted in ascending order, creating an ordered list $L^S$. Lists $L^P$ and $L^S$ may change as step 514 executes, for example as partition capacities and server capacities are assigned and thus removed from the lists. At step 518, the algorithm may execute a loop that ends when list $L^S$ of server capacities is empty. In some examples, the process will be sure to terminate because $\mu^A$ equals to $\Sigma\lambda_k$ (Eq. 24). If list $L^S$ of server capacities is empty, then a solution has been found (step 520), meaning that all servers were allocated to partitions. If $L^S$ is not empty, the algorithm executes additional sub-steps to allocate servers to partitions. At step 524, a condition may also be checked to determine whether the allocation is complete. At step 520, a solution is found and enclosing step 514 may be complete. At step 522, the algorithm may first attempt to allocate any servers to partitions where the server and partition have the same capacity (the exact match cases). This exact match may be performed by, for each server capacity ($\lambda_i$) in list $L^S$, repeating the following sub-steps: If there exists a partition capacity ($\lambda_j^P$) in list $L^P$ such that $\mu_i = \mu_j^P$, allocate server i to partition j, and remove $\mu_i$ from $L^S$, and remove $\mu_j^P$ from $L^P$.

Referring to FIG. 5B, once the exact match cases, if any, are allocated (see FIG. 5A and related description above), the rest of the servers may be allocated to partitions. At step 526, if the smallest server capacity (first entry in list $L^S$) is smaller than the largest partition capacity (first entry in list $L^P$), then the algorithm may, at step 528, allocate the associated server to the associated partition. Additionally, first entry in list $L^S$ may be removed from the list, and the first entry in list $L^P$ may be updated by subtracting the server capacity that was allocated to the partition. At step 530, if the smallest server capacity (first entry in list $L^S$) is greater than the largest partition capacity (first entry in list $L^P$), then the algorithm may, at step 532, allocate the associated server to the associated partition. Additionally, first entry in list $L^P$ may be removed from the list, and the first entry in list $L^S$ may be updated by subtracting the partition capacity that was allocated to the server.

Regarding the second step of the cloud center resource allocation problem, the second step may allocate an optimal amount of each partition's processing capacity to each service instance according to the demand characteristics on each service instance. In the second step, each partition's capacity ($w_i^* \mu^A$) is further partitioned among m application instances within a partition: $w_{ij}^* w_i^* \mu^A$, for j=1 ... m. In step 534, the number of application instances, m, is determined as an input parameter. In some embodiments, it may be assumed that the client demands on the m service instances in partition j are perfectly load-balanced across the service instances. Resource allocation solutions may be extended to other load balancing schemes, for example by applying a probabilistic distribution.

To solve the second step of the cloud center resource allocation problem, the algorithm may solve an objective function for each partition, similar to the relative-to-best-effort objective function, through the core algorithm depicted in FIG. 3. In step 536, client demands on a partition may be divided by the m application instances. For each partition's objective function, $\mu_j^P$ (partition j's capacity) may be used as the general throughput parameter $\mu$, and $[(\lambda_{1j}/m, I_{1j}, U_{1j}), (\lambda_{2j}/m, I_{2j}, U_{2j}), \ldots, (\lambda_{nj}/m, I_{nj}, U_{nj})]$ may be used as the demand characteristics of each of n demand types. In some embodiments, the m instances of the service are assumed to be perfectly load-balanced, and the demands on each instance would be 1/m of the total demands from the clients on the m instances of the service. Step 538 may apply the same objective function and core optimization algorithm (FIG. 3) as explained in relation to the relative-to-best-effort problem formulation to obtain optimal weights $[w_{1j}, w_{2j}, \ldots, w_{nj}]$, which are fractions of partition capacity. For example, the optimization algorithm may assign weights $w_{ij}$ to the processing of the $i^{th}$ type of demands on partition j (for i=1, 2, ..., n and j=1, 2, ..., p). Accordingly, a fraction $w_{ij}$ of partition j's capacity may be allocated to serve the $i^{th}$ type of demands. Step 540 may provide the allocation weights to a scheduler for execution.

In some embodiments of the present disclosure, the systems, methods, routines and/or techniques described herein for dynamically allocating server resources to meet changing demands may be applied to a messaging application server scenario. Some messaging architectures include three distinct components: Publishers, Subscribers, and Brokers. Publishers publish messages of various topics to brokers. Subscribers subscribe to messages of various topics in the brokers. Brokers organize messages received from publishers in data structures like message queues. Brokers match subscribers' subscription criteria (e.g., a specific message topic) with properties of the messages. Brokers disseminate messages matched subscription criteria to subscribers. Subscribers receive messages from brokers. A broker may be, a service provider, while a publisher/subscriber may be a client.

In order to solve a resource allocation problem in the messaging application server scenario, QoS parameters like importance and urgency may be assigned to demands of publishers and subscribers. These QoS parameters may control the prioritization of messages published, processed, and disseminated. In some examples, n types of messages may exist, for example flowing from publishers to brokers and from brokers to subscribers in a messaging system. Each type of message may have an associated pair of QoS parameters (importance, urgency). The broker's rate of processing and delivering messages of all types may be represented by $\mu$ (for example, representing messages per second). The broker's rate of processing (capacity) may be exhibited by the volume and speed by which the broker disseminates messages. Publishers may send messages of the $i^{th}$ type at arrival rate of $\lambda_i$. In these examples, one goal may be to allocate broker resources to the n types of messages to maximize the value of the messaging system. This problem may be similar to the resource allocation problems described in relation to the relative-to-best-effort problem formulation and/or the relative-to-delay-bound problem formulation.

In some messaging architectures, messages could be large (comprise a large amount of data/bytes) and may consume significant network bandwidth (and thus time) to disseminate the messages. In some situations, subscribers may not receive the messages at the speed a broker attempts to deliver due to bandwidth limitations between the broker and some or all of the subscribers. In some situations, subscribers may not receive the messages at the speed a broker attempts to deliver due to limited processing power of the subscribers. Optimal resource allocation techniques described herein, including objective functions and optimization algorithms, may be used to assign weights to each type of message. According to each message's weight, it may receive a fraction of the broker's processing capacity.

In some embodiments, the resource allocation problem may consider the receiving capacity of the receivers, for example so that it prevents over-allocating resources to certain messages where the subscribers cannot keep up with the speed and volume of delivery. In one example, $[S_{i1}, S_{i2}, \ldots, S_{ik}]$ may be k subscribers to messages of the $i^{th}$ type. A term $r_{ik}$ may represent the receiving rate of subscriber $S_{ik}$, where $r_{ik}$ may be provided as input/parameter or may be estimated by monitoring the subscriber's receiving speed. A term $r_i$ may represent the combined receiving rate of the k subscribers, where $r_i = g(r_{i1}, r_{i2}, \ldots, r_{ik})$. The function g may be a variety of functions, for example an average, minimum, or maximum function. A term $w_i$ may be the weight (fraction of processing capacity) assigned to messages of the $i^{th}$ type in the broker. Therefore, the total number of messages per second the broker must deliver to the k subscribers may be represented by $w_i^* \mu$, resulting in the following constraint (Constr. 9) on the problem formulation. If $b_i$ is used to represent $r_i/\mu$, the Constr. 9 may be simplified to Constr. 10. This problem formulation may be referred to as the messaging-bounded-delivery formulation.

$$w_i \mu \leq r_i \text{ i.e., } w_i \leq r_i/\mu \qquad \text{(Constr. 9)}$$

$$w_i \leq b_i \qquad \text{(Constr. 10)}$$

Assuming messages on average have the same size, Constr. 10 may ensure that the total attempted volume and speed of message delivery to the k subscribers will not exceed their receiving capacity. Optimal resource allocation solutions for this messaging-bounded-delivery formulation may be solved with the same objective function and a similar solution algorithm as the relative-to-best-effort problem formulation. Instead of lower bound constraints ($a_i <= w_i$) in the relative-to-best-effort problem formulation, upper bound constraints ($w_i <= b_i$) are included. It is clear that the systems, methods, routines and/or techniques described herein may be applicable to a range of systems and conditions/constraints.

In some embodiments, the resource allocation problem may be generalized in an objective function and related constraints (shown below) similar to the ones specified for the relative-to-best-effort problem formulation. An exemplary representation of an objective function is shown in Eq. 25. The objective function may be subject to one or more constraints, for example Constr. 11-14.

$$\sum_{i=1}^{n} \frac{v_i}{\mu w_i - \lambda_i} \quad \text{(Eq. 25)}$$

$$\sum_{i=1}^{n} w_i = 1 \quad \text{(Constr. 11)}$$

$$a_i \le w_i \le b_i \text{ for } i=1, \ldots, n \quad \text{(Constr. 12)}$$

$$\sum_{i=1}^{n} a_i \le 1 \le \sum_{i=1}^{n} b_i \quad \text{(Constr. 13)}$$

$$\sum_{i=1}^{n} \lambda_i \le \mu \quad \text{(Constr. 14)}$$

In the above mathematical problem, $\lambda_i$, $v_i$, $a_i$, $b_i$ are positive constants from the input satisfying Constr. 13 and 14; $\mu$ and $w_i$'s are variables. An algorithm to find optimal solutions to the optimization problem may include optimizing the objective function by minimizing Eq. 25. Such an optimization algorithm may be similar to the core algorithm depicted in FIG. 3.

In some embodiments of the present disclosure, the systems, methods, routines and/or techniques described herein for dynamically allocating server resources to meet changing demands may be applied to experiments to determine the capacity of a server and its impact on the service rate. In some embodiments, the systems, methods, routines and/or techniques described herein may be utilized by a service provider for design experiments, for example to plan server capacity for cloud providers. In some embodiments, a consumer of cloud services may use the systems, methods, routines and/or techniques described herein to determine how many resources are required for a cloud server to meet the demands of clients on its services hosted in the cloud. The throughput of services running on a server may be defined by a service rate p. The throughput of a particular service running on a server may depend on the capacity of the server and the amount of the capacity allocated to the service. In some situations, the capacity of a server and its impact on the service rate $\mu$ can be identified through design experimentations, for example using the techniques described herein.

In one example, the total server processing rate $\mu$ may be designated as a design variable rather than a given parameter (like in the relative-to-best-effort problem formulation). Design experiments may be performed to evaluate a variety of values given to $\mu$, each of which may be used to invoke an optimization algorithm, similar to the one depicted in FIG. 3, to find the best resource allocations to applications and the maximum total delivered value of the system in which the applications are executed. Similarly, when a consumer plans to purchase cloud resources for his/her applications to be hosted in cloud services, design experiments may be performed using the methods described herein to find the best combination of amount of resources, cost, and delivered values.

Figure 6A:
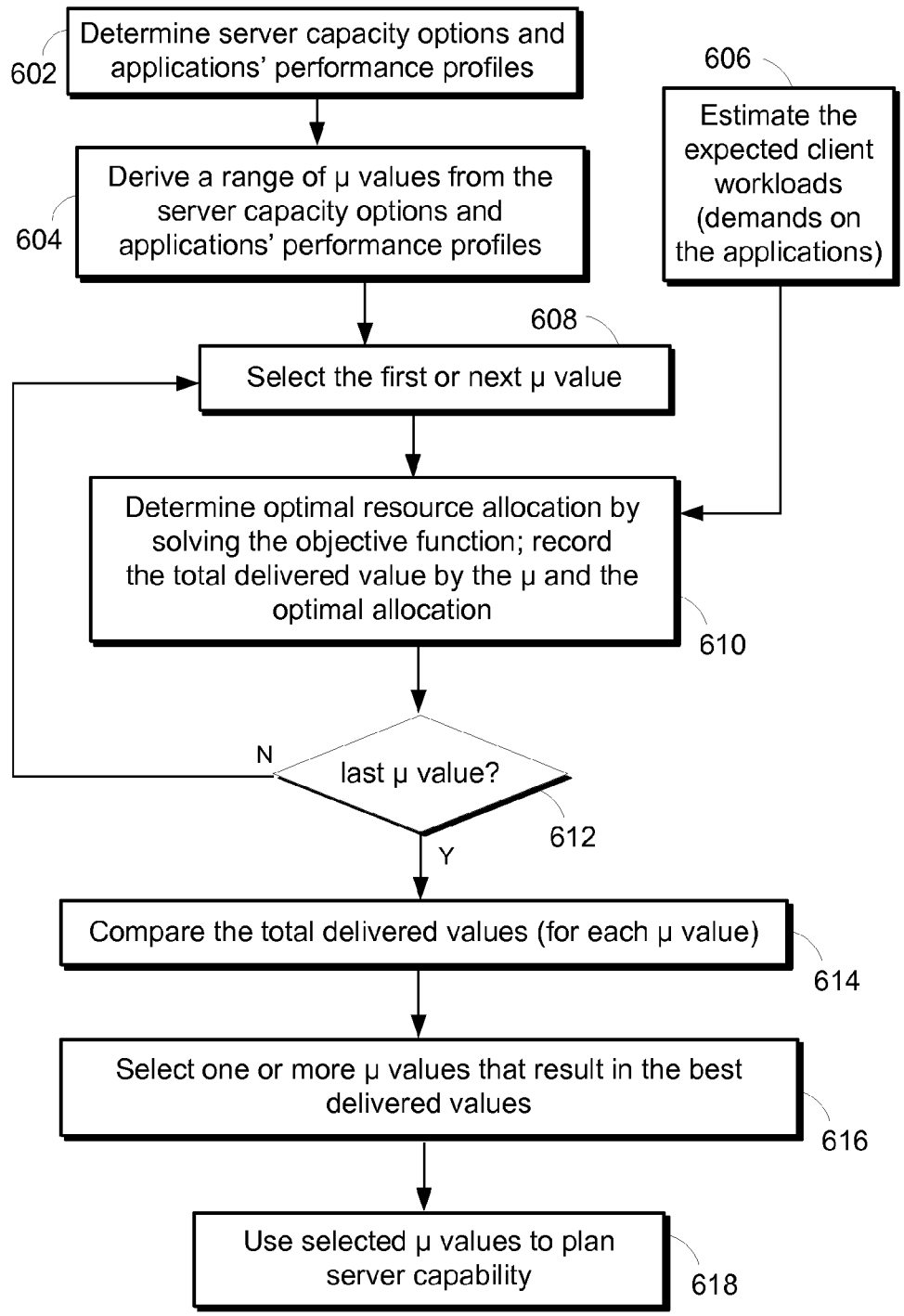
FIG. 6A depicts a flow diagram that shows example steps in the operation of design experimentations for server and/or cloud data center resource planning, in accordance with one or more embodiments of the present disclosure.

FIG. 6A depicts a flow diagram 600 that shows example steps in the operation of design experiments for server and/or cloud data center resource planning, in accordance with one or more embodiments of the present disclosure. In some embodiments of the present disclosure, an algorithm for solving a design-experiment objective function may consists of one or more of the steps depicted in FIG. 6A, and perhaps additional steps. Referring to FIG. 6A, at step 602, available server capacity options including the number of servers and their individual capacities and the anticipated performance of the applications executing on these servers may be determined as input. At step 604, the algorithm may derive a range of $\mu$ values $[\mu_1, \mu_2, \ldots, \mu_k]$ for the experiments, where each $\mu$ value represents the service rate for client demands of the applications. At step 606, the algorithm may receive as input expected client demands on the applications, represented as arrival rates $\lambda$. At steps 608-612, the algorithm may loop through each $\mu$ value (from j=1 to k). For each $\mu$ value, at step 610, the algorithm may solve an objective function that determines weights $w_i$ for each demand type, maximizing the total delivered value of the objective function $V_j$. Once a total delivered value $V_j$ is determined for each $\mu$ value, all $V_j$'s (from j=1 to k) may be compared, at step 614. At step 616, one or more $\mu_j$'s may be selected to deliver required objective values. These $\mu_j$'s may represent acceptable service rates for the server capacity matching expected client demands, and at step 618, the $\mu_j$'s may be used to plan a data center's server capability.

Figure 6B:
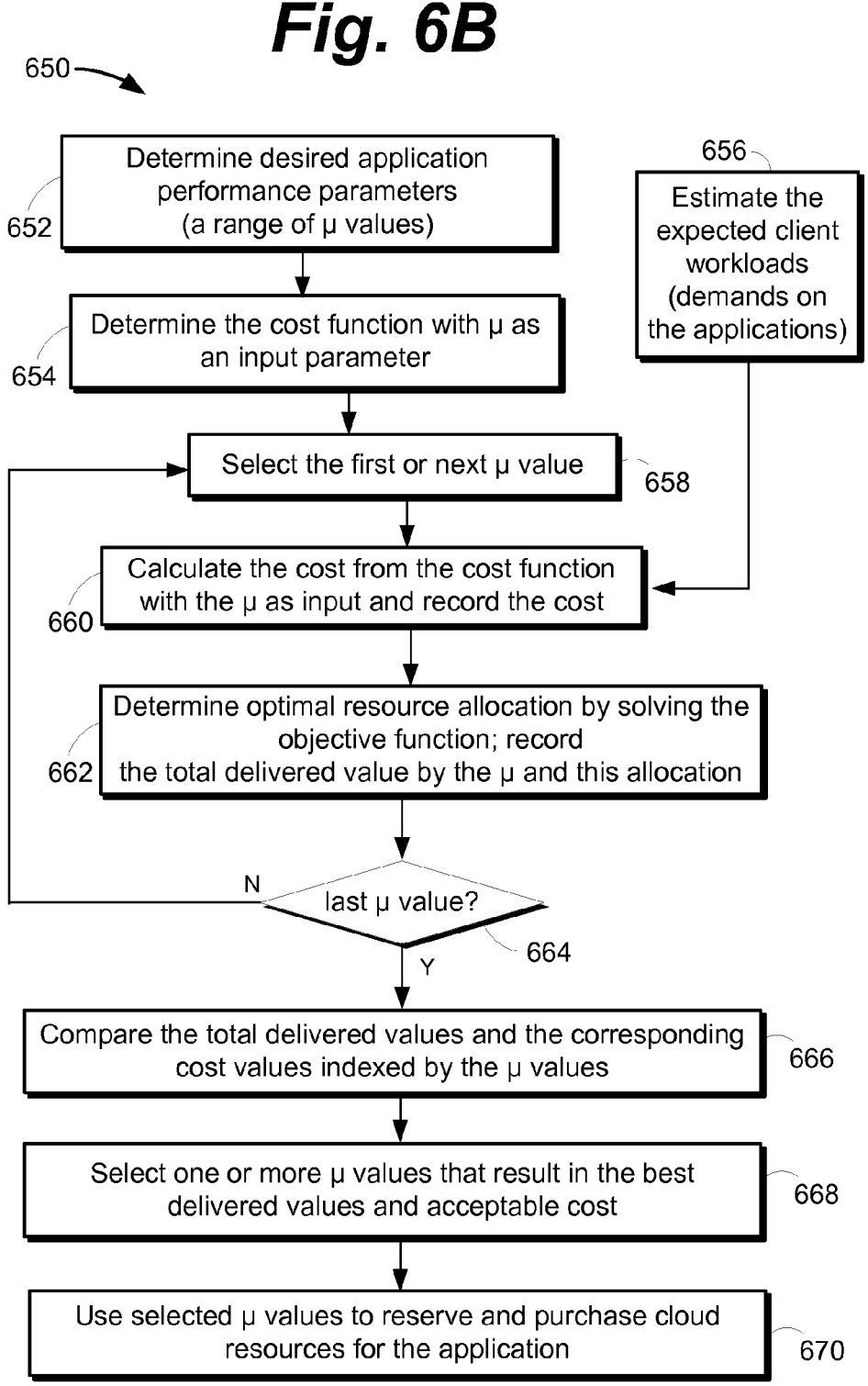
FIG. 6B depicts a flow diagram that shows example steps in the operation of design experimentations for determining resource needs by a consumer of cloud resources, in accordance with one or more embodiments of the present disclosure.

In another example, a consumer of cloud services may use the methods in the present disclosure to determine the consumer's capacity needs such as an amount of computers, storage and network bandwidth needed to meet performance requirements for the consumer's applications hosted in the cloud. FIG. 6B depicts a flow diagram 650 that shows example steps in the operation of design experimentations for determining resource needs by a consumer of cloud resources, in accordance with one or more embodiments of the present disclosure. A consumer may pay for the amount of cloud resources used to host the consumer's applications. A consumer may use the steps in FIG. 6B to find the best performance-cost tradeoff. Referring to FIG. 6B, at step 652, a consumer may determine the desired range of performance parameters as service rate values. At step 654, a consumer may determine the cost function to calculate the cost for achieving the performance parameters. At step 656, a consumer may estimate the client demands on the consumer's applications as arrival rate $\lambda$ values. At step 658, a consumer may select a service rate $\mu$ value (the first or next value from a list of acceptable service rates) to perform an experiment. At step 660, a consumer may calculate how much cost is needed to purchase the capacity indicated by $\mu$. At step 662, a consumer may apply an optimization algorithm (similar to the one described in relation to FIG. 3) to determine an optimal resource allocation to achieve the highest delivered value. At step 664, the method may determine whether additional experiments should be performed by determining whether any $\mu$ values remain. At step 666, a consumer may compare the service rates, costs and delivered values determined by the loop of steps 658 to 664. At step 668, a consumer may select the best service rate, cost and delivered value. At step 670, a consumer may use the service rate µ to reserve and purchase the amount of cloud resources to host the consumer's applications.

The systems, methods, routines and/or techniques described herein have been tested utilizing research prototypes and/or simulation models. For example, simulation models may accept input parameters, formulate one or more objective functions and apply one or more optimization algorithms. Example input parameters may represent client workloads/QoS characteristics. Example input parameters may be chosen and/or generated strategically for the simulation model to test interesting and/or extreme cases to fully test the techniques systems, methods, routines and/or techniques described herein. Example input parameters may be chosen and/or generated, for example with an element of randomness, in order to test many scenarios.

In addition to the benefits of the autonomous and adaptive resource management systems, methods, routines and/or techniques already described in this disclosure, the following describes further benefits of one or more embodiments. It is to be understood that benefits and advantages described throughout this disclosure are not limitations or requirements, and some embodiments may omit one or more of the described benefits and/or advantages.

The systems, methods, routines and/or techniques described herein may allocate resources more efficiently in mission-critical systems. For example, embodiments described herein that use two-dimensional demand characteristics (importance and urgency values) offer benefits beyond systems that used a one-dimensional parameter, such as priority. For example, a high importance application may be paused or its data update rates may be reduced when the application's urgency becomes low for a period of time so that other applications of the same importance may get more resources, and perhaps run faster. Such a scenario would be difficult to support by using a one-dimensional priority scheme, for example because the priority of a low-urgency application may remain the same relative to high-urgency applications due to the same importance of the applications. Enhanced efficiency may result in reduced costs, increased revenues, improved system performance, increased responses to client demand changes, and/or decreases in overhead, for example due to manual administration of system configurations and resource allocations.

The systems, methods, routines and/or techniques described herein may result in a mission-critical system whose performance is guaranteed to achieve the maximum delivered value possible among all resource allocation solutions including those from a best effort approach.

The systems, methods, routines and/or techniques described herein may be applicable to several resource-allocation scenarios, for example client-server scenarios, messaging applications scenarios, publish-subscribe scenarios, cloud-based distributed system scenarios, and network router scenarios. A network router may itself be one example of a QoS-managed server. The Service Level Agreement (SLA) Formulation Service module 204 as depicted in FIG. 2A may formulate the objective function and associated constraints in accordance with the scenarios, as described in the present disclosure. Therefore, the systems, methods, routines and/or techniques described herein may be generally and widely applicable.

The present disclosure may be realized in hardware, software, or a combination of hardware and software. The present disclosure may be realized in a centralized fashion in at least one machine, computer and/or data processing system; or in a distributed fashion where different elements are spread across several interconnected machines, computers and/or data processing systems. Any kind of machine, computer and/or data processing system or other apparatus adapted for carrying out the methods described herein may be suited. A typical combination of hardware and software may be a general-purpose computer system with a computer program that, when being loaded and executed, controls the computer system such that it carries out the methods and techniques described herein. A data processing system may be used to implement the systems, methods, routines and/or techniques described herein, for example because a large quantity of procedures, algorithms, steps and the like may be required to control resource utilization to achieve mission objectives. Typical (for example, real world) resource utilization problems may be extremely complex cases. For example, in a cloud computing application, thousands or even millions of clients may be requesting resources concurrently. In complex resource utilization problems, procedures, algorithms and the like used to determine optimal allocations may include thousands or even millions of steps and/or iterations. In these situations, for example, a data processing system may be required.

The methods, routines and solutions of the present disclosure, including the example methods and routines illustrated in the flowcharts and block diagrams of the different depicted embodiments may be implemented as software executed by a data processing system that is programmed such that the data processing system is adapted to perform and/or execute the methods, routines, techniques and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. In some alterative implementations of the present disclosure, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. The different embodiments of the present disclosure can take the form of computer code stored on persistent storage and/or a computer program product accessible from a computer usable or computer readable medium providing program code for use by or in connection with a computer or any device or system that executes instructions. Part or all of the computer code may be loaded into the memory of a data processing system before the data processing system executes the code.

Figure 7:
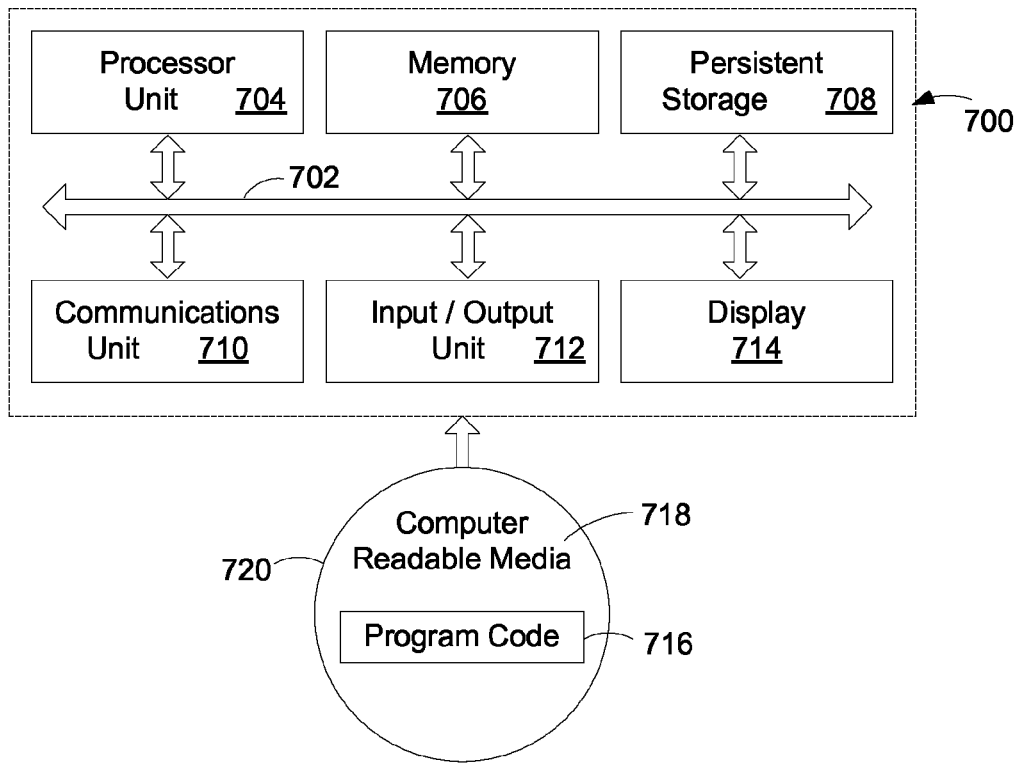
FIG. 7 depicts a diagram of an example data processing system that may execute, either partially or wholly, one or more of the methods, routines and solutions of the present disclosure, in accordance with one or more embodiments of the present disclosure.

Turning now to FIG. 7, a diagram of an example data processing system 700 is depicted that may execute, either partially or wholly, one or more of the methods, routines and solutions of the present disclosure. In some embodiments of the present disclosure, more than one data processing system, for example data processing systems 700, may be used to implement the methods, routines, techniques and solutions described herein. In the example of FIG. 7, data processing system 700 may include a communications fabric 702 which provides communications between components, for example a processor unit 704, a memory 706, a persistent storage 708, a communications unit 710, an input/output (I/O) unit 712 and a display 714. In one specific embodiment, the data processing system 700 may be a personal computer (PC) or other computer architecture in connection with a monitor, keyboard, mouse and perhaps other peripheral devices.

Processor unit 704 may serve to execute instructions (for example, a software program) that may be loaded into memory 706. Processor unit 704 may be a set of one or more processors or may be a multiprocessor core depending on the particular implementation. Further, processor unit 704 may be implemented using one or more heterogeneous processor systems in which a main processor is present with secondary processors on a single chip. As another illustrative example, processor unit 704 may be a symmetric multi-processor system containing multiple processors of the same type.

Memory 706 in these examples may be, for example, a random access memory or any other suitable volatile or non-volatile storage device. Persistent storage 708 may take various forms depending on the particular implementation. For example, persistent storage 708 may contain one or more components or devices. For example, persistent storage 708 may be a hard drive, a flash memory, a rewritable optical disk, a rewritable magnetic tape or some combination of the above. The media used by persistent storage 708 also may be removable. For example a removable hard drive may be used.

Instructions for an operating system may be located on persistent storage 708. In one specific embodiment, the operating system may be some version of a number of known operating systems. Instructions for applications and/or programs may also be located on persistent storage 708. These instructions may be loaded into memory 706 for execution by processor unit 704. For example, the processes of the different embodiments described in this disclosure may be performed by processor unit 704 using computer implemented instructions which may be loaded into a memory such as memory 706. These instructions are referred to as program code, computer usable program code or computer readable program code that may be read and executed by a processor in processor unit 704. The program code in the different embodiments may be embodied on different physical or tangible computer readable media such as memory 706, persistent storage 708 and/or other computer readable media, for example as part of a CD or DVD.

Instructions for applications and/or programs may be located on a computer readable media 718 that is not permanently included in the data processing system 700. For example, program code 716 may be located in a functional form on computer readable media 718 and may be loaded into or transferred to data processing system 700 for execution by processor unit 704. Program code 716 and computer readable media 718 may form computer program product 720. In one example, computer readable media 718 may be in a tangible form such as, for example, an optical or magnetic disc that is inserted or placed into a drive or other device, for transfer onto a storage device such as a hard drive that is part of persistent storage 708. The drive or other device may be connected to and in communication with other components of the data processing system 700, for example, via the communications fabric 702 or via the input/output unit 712. In another tangible form, computer readable media 718 may be a persistent storage such as a hard drive or a flash memory that is connected to data processing system 700.

For the purposes of this disclosure a computer usable or computer readable medium can generally be any tangible apparatus that can contain, store, communicate, propagate or transport the data (such as a software program) for use by or in connection with a system, for example one that executes instructions. The computer usable or computer readable medium can be for example without limitation an electronic magnetic optical electromagnetic infrared or semiconductor system or a propagation medium. Non-limiting examples of a computer readable medium include a semiconductor or solid state memory magnetic tape, a removable computer diskette, a random access memory (RAM), a read only memory (ROM), a rigid magnetic disk and an optical disk. Optical disks may include compact disk read only memory (CD ROM), compact disk read write (CD R/W) and DVD. Further, a computer usable or computer readable medium may contain or store a computer readable or usable program code such that when the computer readable or usable program code is executed on a computer the execution of this computer readable or usable program code causes the computer to execute specified routines, procedures, steps and the like. The tangible form of computer readable media is also referred to as computer recordable storage media.

Display 714 may provide a mechanism to display information to a user, for example via a CRT, LCD or LED monitor, or other type of display. It should be understood, throughout this disclosure, that the term "display" may be used in a flexible manner to refer to either a physical display such as a monitor, or to the image that a user sees on the screen of a physical device.

Input/output (I/O) unit 712 allows for input and output of data with other devices that may be connected to data processing system 700. For example, input/output unit 712 may provide a connection for user input through a keyboard, touch screen, mouse, and/or other pointing devices. Further, input/output unit 712 may send output to a printer. Input/output devices can be coupled to the system either directly or through intervening I/O controllers. Different communication adapters may also be coupled to the system to enable the data processing system to become coupled to other data processing systems or remote printers or storage devices through intervening private or public networks. Non-limiting examples such as modems and network adapters are just a few of the currently available types of communications adapters. Program code 716 may be transferred to data processing system 700 from computer readable media 718 through a connection to input/output unit 712. The connection may be physical or wireless in the illustrative examples. The computer readable media also may take the form of non-tangible media such as communications links or wireless transmissions containing the program code.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. For example, a bus system may be used to implement communications fabric 702 and may be comprised of one or more buses such as a system bus or an input/output bus. The bus system may be implemented using any suitable type of architecture that provides for a transfer of data between different components or devices attached to the bus system. Additionally a communications unit may include one or more devices used to transmit and receive data such as a modem or a network adapter. Further a memory may be, for example, memory 706 and/or a cache such as those found in an interface and memory controller hub that may be present in communications fabric 702.

Communications unit 710 may provide for communications with other data processing systems or devices. In these examples, communications unit 710 may be a network interface card. Communications unit 710 may provide communications through the use of either or both physical and wireless communications links unit allows for input and of data. The communications link may be physical or wireless in the illustrative examples. The computer readable media also may take the form of non-tangible media such as communications links or wireless transmissions containing the program code.

Figure 8:
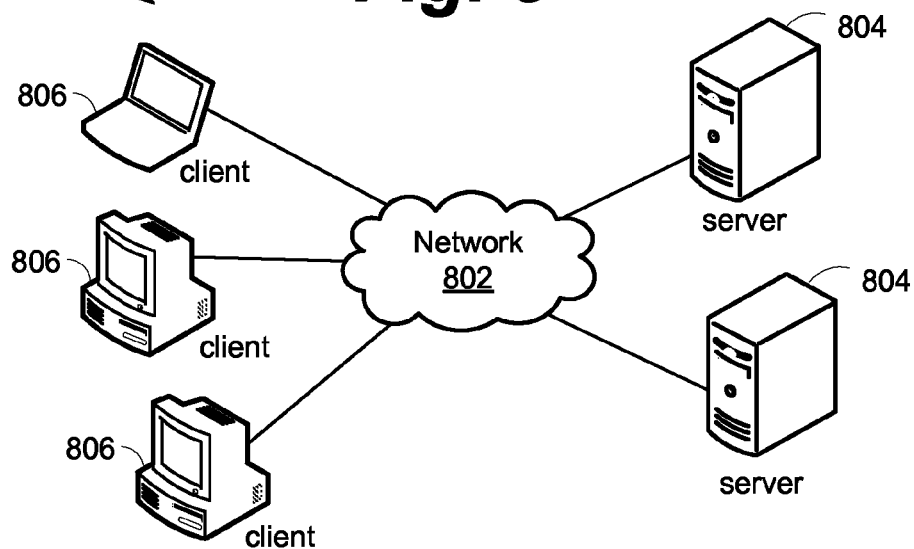
FIG. 8 depicts a diagram of an example network of data processing systems that may execute, either partially or wholly, one or more of the methods, routines and solutions of the present disclosure, according to one or more embodiments of the present disclosure.

Referring to FIG. 8, a diagram of an example network of data processing systems is depicted according to one or more embodiments of the present disclosure. Network data processing system 800 is a network of data processing systems 804, 806, whereby more specifically, a network 802 connects two or more data processing systems. Network 802 is a medium used to provide communication links between various data processing systems (and perhaps other devices), and network 802 may include connections such as wired or wireless communication links, or perhaps fiber optic cables. Each data processing system included in network 800 may include a communications unit, for example communications unit 810 of FIG. 8, thereby allowing the data processing system to interact with the network 802 and other data processing systems. A QoS Manager may reside on one or more data processing systems 804 to control the resource allocations using the systems, methods, routines and/or techniques described herein in this disclosure.

In the example shown in FIG. 8, one or more servers 804 (or administrator machines) may be connected to network 802. In addition, one or more clients 806 may be connected to network 802. These clients 806 may be for example personal computers, end-user computers, client machines, or for example discrete processes and/or applications running on a computer. In some examples, servers 804 and clients 806 may be computers located within a single building or region, in which case the network 802 may be an internal network such as an intranet. In other examples, the servers 804 and clients 806 may be computers located in different geographic locations, in which case the network 802 may include internet connections and perhaps remote secured connections. In some examples, network 802 represents a worldwide collection of networks and gateways that use the Transmission Control Protocol Internet Protocol (TCP IP) suite of protocols to communicate with one another. Network data processing system 800 also may be implemented as a number of similar or different types of networks such as, for example an intranet, a local area network (LAN) or a wide area network (WAN). Applications may be hosted and executed in one or more of the servers 804. FIG. 8 is intended as an example and not as an architectural limitation for different embodiments. It should be understood that network data processing system 800 may include additional (or fewer) servers 804, clients 806 and perhaps other devices not shown.

The description of the different advantageous embodiments has been presented for purposes of illustration and the description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments of the practical application and to enable others of ordinary skill in the art to understand the disclosure for various embodiments with various modifications as are suited to the particular use contemplated.

The invention claimed is:

1. A computer implemented method for resource management, comprising:

executing, on one or more computers, a routine that receives as input mission objective parameters;

executing, on the one or more computers, a routine that formulates an objective function and one or more objective values using the mission objective parameters, the one or more parameters determined by a best effort resource allocation strategy, the best effort resource allocation strategy allocating resources equally among one or more clients, and one or more response time constraints associated with each type of demand of a plurality of demands from one or more clients, each of the one or more response time constraints being determined as a factor of a first delay bound of the best effort resource allocation strategy and a tolerance factor, the tolerance factor used to calculate a second delay bound for each of the response time constraints that is less than a corresponding first delay bound of the best effort resource allocation strategy;

executing, on the one or more computers, a routine that autonomously optimizes the objective function using an optimization algorithm to determine optimal resource allocations and associated delivered values; and executing, on the one or more computers, a routine that indicates, via a configuration controller, the optimal resource allocations to one or more service providers, such that the service providers may implement the optimal resource allocations to process demands from one or more clients;

wherein the objective function includes an optimal weight term for each client demand type that represents an optimal fraction of resources that should be devoted to each type of client demands; and wherein autonomously optimizing the objective function includes determining a value for one or more of the optimal weight terms.

2. The computer implemented method of claim 1, further comprising:

executing, on the one or more computers, a routine that receives as input monitored workloads of the one or more clients;

executing, on the one or more computers, a routine that receives as input monitored performance metrics of the one or more service providers;

executing, on the one or more computers, a routine that determines actual and predicted workloads and performance metrics using the monitored workloads and the monitored performance metrics, wherein the actual and predicted workloads and performance metrics are used to autonomously optimize the objective function.

3. The computer implemented method of claim 2, further comprising:

executing, on the one or more computers, a routine that compares the delivered values associated with the optimal resource allocations to the one or more objective values;

executing, on the one or more computers, one or more adaptive algorithms based on the comparison to determine one or more adaptive actions; and indicating, to the configuration controller, the one or more adaptive actions.

4. The computer implemented method of claim 3, wherein some or all of the steps of the method are continuously executed to adapt to variations in inputs.

5. The computer implemented method of claim 1, wherein the objective function allows for the determination of an optimal resource allocation relative to a resource allocation that uses a best effort approach.

6. The computer implemented method of claim 5, wherein the objective function allows for the determination of an optimal resource allocation that achieves the maximum delivered value possible among all resource allocations.

7. The computer implemented method of claim 1, wherein the mission objective parameters include one or more demand characteristics for each type of client demands.

8. The computer implemented method of claim 7, wherein the one or more demand characteristics include importance and urgency values for each type of client demands.

9. The computer implemented method of claim 7, wherein the one or more mission objective parameters include two-dimensional quality of service values for each type of client demands.

10. The computer implemented method of claim 7, wherein the one or more demand characteristics include an expected arrival rate for each type of client demands.

11. The computer implemented method of claim 7, wherein the objective function includes a best-effort weight term for each client demand type that represents the fraction of resources devoted to each type of client demand using a best-effort approach.

12. The computer implemented method of claim 1, wherein the mission objective parameters include a service rate that represents the rate at which the service provider can process requests for all client demands.

13. A resource management system,
a data storage device; and
a processor, coupled to the data storage device and configured to execute program instructions stored in the data storage device, the program instructions comprising instructions for operating at least one of a quality of service manager, a service level agreement (SLA) formulation service module, a resource manager, and a configuration controller, comprising:
the quality of service manager that is operable to manage allocation of resources, wherein the resources are hosted on one or more service providers and one or more clients demand access to the resources;
the service level agreement (SLA) formulation service module that is operable to:
  receive as input mission objective parameters, and
  formulate an objective function and one or more objective values using the mission objective parameters, one or more parameters determined by a best effort resource allocation strategy, the best effort resource allocation strategy allocating resources equally among one or more clients, and one or more response time constraints associated with each type of demand of a plurality of demands from one or more clients, each of the one or more response time constraints being determined as a factor of a first delay bound of the best effort resource allocation strategy and a tolerance factor, the tolerance factor used to calculate a second delay bound for each of the response time constraints that is less than a corresponding first delay bound of the best effort resource allocation strategy, wherein the objective function includes an optimal weight term for each client demand type that represents an optimal fraction of resources that should be devoted to each type of client demands and autonomously optimizing the objective function includes determining a value for one or more of the optimal weight terms;
the resource manager that is operable to autonomously optimize the objective function using an optimization algorithm to determine optimal resource allocations and associated delivered values;
the configuration controller that is operable to indicate the optimal resource allocations to the one or more service providers, such that the service providers may implement the optimal resource allocations to process demands from the one or more clients.

14. The system of claim 13, further comprising:
a workload monitoring service module that is operable to receive as input monitored workloads of the one or more clients;
a performance monitoring service module that is operable to receive as input monitored performance metrics of the one or more service providers;
a prediction service module that is operable to determine actual and predicted workloads and performance metrics using the monitored workloads and the monitored performance metrics,
wherein the prediction service module communicates actual and predicted workloads and performance metrics to the resource manager to be used to autonomously optimize the objective function.

15. The system of claim 14, further comprising an adaptation service module that is operable to:
compare the delivered values associated with the optimal resource allocations to the one or more objective values;
execute one or more adaptive algorithms based on the comparison to determine one or more adaptive actions; and
indicate, to the configuration controller, the one or more adaptive actions.

16. The system of claim 13, wherein the objective function adapts the resource management system to determine an optimal resource allocation relative to a resource allocation that uses a best effort approach.

17. The system of claim 16, wherein the objective function adapts the resource management system to determine an optimal resource allocation that achieves the maximum delivered value possible among all resource allocations.

18. The system of claim 13, wherein the mission objective parameters include one or more demand characteristics for each type of client demand, wherein the one or more demand characteristics include importance and urgency values.

19. A cloud data center, comprising the resource management system of claim 15.

20. A messaging application server, comprising the resource management system of claim 15.

21. A client-server application server, comprising the resource management system of claim 15.

* * * * *